United States Patent
Taniguchi et al.

(10) Patent No.: US 10,006,677 B2
(45) Date of Patent: Jun. 26, 2018

(54) METHOD FOR MANUFACTURING SHAPED PRODUCT WITH MAINTAINED ISOTROPHY

(71) Applicant: Teijin Limited, Osaka-shi, Osaka (JP)

(72) Inventors: Michiharu Taniguchi, Matsuyama (JP);
Motoomi Arakawa, Matsuyama (JP);
Yasunori Nagakura, Matsuyama (JP);
Tsukasa Arai, Matsuyama (JP);
Akihiko Obata, Matsuyama (JP)

(73) Assignee: Teijin Limited, Osaka-Shi, Osaka (JP)

( * ) Notice: Subject to any disclaimer, the term of this patent is extended or adjusted under 35 U.S.C. 154(b) by 1022 days.

(21) Appl. No.: 14/530,018

(22) Filed: Oct. 31, 2014

(65) Prior Publication Data

US 2015/0064408 A1   Mar. 5, 2015

Related U.S. Application Data

(63) Continuation of application No. 14/091,782, filed on Nov. 27, 2013, now Pat. No. 8,900,502, which is a
(Continued)

(30) Foreign Application Priority Data

May 31, 2011   (JP) .................................. 2011-122120

(51) Int. Cl.
*B29C 70/12*   (2006.01)
*B29C 70/42*   (2006.01)
(Continued)

(52) U.S. Cl.
CPC .............. *F25B 27/00* (2013.01); *B29C 43/02* (2013.01); *B29C 43/18* (2013.01); *B29C 70/12* (2013.01);
(Continued)

(58) Field of Classification Search
CPC .......... B29C 43/92; B29C 70/12; B29C 70/42; B29C 70/40; B29C 70/305; B29C 43/02;
(Continued)

(56) References Cited

U.S. PATENT DOCUMENTS 5,403,654 A * 4/1995 Muto .................... D04H 1/587
                                                          428/378
5,883,023 A    3/1999 Martine et al.
(Continued)

FOREIGN PATENT DOCUMENTS

CN    102056971 A    5/2011
EP      0376472 A2    4/1990
(Continued)

OTHER PUBLICATIONS

Jespersen, S.T., Baudry, F., Wakeman, M.D., Michaud, V., Blanchard, P., Norris, R., and Manson, J-A.E., "Consolidation of Net-shape Random Fiber Thermoplastic Composite Preforms" Polymer Composites—2010, pp. 653-665.
(Continued)

*Primary Examiner* — Camie S Thompson
(74) *Attorney, Agent, or Firm* — Banner & Witcoff, Ltd.

(57) ABSTRACT

The present invention provides a method for manufacturing a shaped product constituted by a fiber-reinforced composite material including reinforcing fibers and a thermoplastic resin. The shaped product maintains isotropy of the fibers to the end thereof even if press-molded under conditions in which charge ratio of a prepreg to a die is low. Specifically, the method includes using a specific prepreg obtained by impregnating the reinforcing fibers with thermoplastic resin, and molding-processing the prepreg under specific conditions.

6 Claims, 9 Drawing Sheets

Related U.S. Application Data continuation of application No. PCT/JP2012/063731, filed on May 29, 2012.

(51) Int. Cl.

| | | |
|---|---|---|
| *B29C 70/30* | (2006.01) | |
| *F25B 27/00* | (2006.01) | |
| *B29C 43/02* | (2006.01) | |
| *B29C 43/18* | (2006.01) | |
| *B29C 70/46* | (2006.01) | |
| *B29C 70/40* | (2006.01) | |
| *F24D 12/02* | (2006.01) | |
| *F24D 15/04* | (2006.01) | |
| *F25B 30/02* | (2006.01) | |
| *F25B 30/06* | (2006.01) | |
| *F25B 49/02* | (2006.01) | |
| *B29K 101/12* | (2006.01) | |
| *B29K 105/08* | (2006.01) | |
| *B29K 77/00* | (2006.01) | |
| *B29K 307/04* | (2006.01) | |
| *B29K 309/08* | (2006.01) | |

(52) U.S. Cl.
CPC ............ *B29C 70/305* (2013.01); *B29C 70/40* (2013.01); *B29C 70/42* (2013.01); *B29C 70/46* (2013.01); *F24D 12/02* (2013.01); *F24D 15/04* (2013.01); *F25B 30/02* (2013.01); *F25B 30/06* (2013.01); *F25B 49/02* (2013.01); *B29K 2077/00* (2013.01); *B29K 2101/12* (2013.01); *B29K 2105/0872* (2013.01); *B29K 2307/04* (2013.01); *B29K 2309/08* (2013.01); *F24D 2200/11* (2013.01); *Y02B 10/40* (2013.01); *Y02B 30/12* (2013.01); *Y02B 30/14* (2013.01); *Y10T 428/24479* (2015.01); *Y10T 428/24628* (2015.01); *Y10T 428/24994* (2015.04)

(58) Field of Classification Search
CPC ........ B29K 2101/12; B29K 2105/0872; B29K 2307/04; Y10T 428/24479; Y10T 428/24994
USPC .............................. 428/156, 297.4, 174, 220
See application file for complete search history.

(56) References Cited

U.S. PATENT DOCUMENTS

| | | |
|---|---|---|
| 2011/0143110 A1 | 6/2011 | Tsuchiya et al. |
| 2013/0317161 A1* | 11/2013 | Konagai ................. B29C 70/12 524/495 |

FOREIGN PATENT DOCUMENTS

| | | |
|---|---|---|
| EP | 0376472 A2 | 7/1990 |
| EP | 0483716 A1 | 5/1992 |
| EP | 1988118 A1 | 11/2008 |
| JP | H04-193504 A | 7/1992 |
| JP | H05-132568 A | 5/1993 |
| JP | 07067694 | 7/1995 |
| JP | H08-090571 A | 4/1996 |
| JP | H09-155862 A | 6/1997 |
| JP | H10-100174 A | 4/1998 |
| JP | 2003-136550 A | 5/2003 |
| JP | 2005-271220 A | 10/2005 |
| JP | 2010-235779 A | 10/2010 |
| JP | 2010-253938 A | 11/2010 |
| JP | 2011-178890 A | 9/2011 |
| JP | 2011-178891 A | 9/2011 |
| JP | 2012-158846 A | 8/2012 |

OTHER PUBLICATIONS

Mulligan, D.R., Ogin, S.L., Smit, P.A., Wells, G.M., and Worrall, C.M., "Fibre-bundling in a short-fibre coposite: 1. Review of literature and development of a method for controlling the degree of bundling," Composites Science and Technology, 63 (2003) 715-725.
Feb. 12, 2015—(EP) Third Party Observations—App 20120792720.
Apr. 16, 2015—(CN) Office Action—App 201280026560.3—Eng Tran.
Oct. 29, 2014—(EP) Supplementary Search Report—App 12792720.0.
Nov. 25, 2014—(EP) Office Action—App 12792720.0.
International Search Report issued in corresponding International Patent Application No. PCT/JP2012/063731 dated Jul. 24, 2012.
Written Opinion dated Jul. 24, 2012 in related PCT/JP2012/063731.
Office Action dated Apr. 8, 2014 in corresponding Japanese Patent Application No. JP 2013-518096.
Office Action dated May 2, 2014 in corresponding Korean patent application 10-2013-7031650.
Notice of Allowance issued in corresponding U.S. Appl. No. 14/091,782 dated Aug. 1, 2014.
Jun. 25, 2015—(EP) Office Action—App 12792720.0.
Jespersen, S.T., Wakeman, M.D., and Norris, R.E., "Rapid Processing of Net-Shape Thermoplastic Planar-Random Composite Preforms," Appl Compos Mater (2009) 16:55-71.
Jan. 25, 2016—(EP) Third Party Observation—App 20120792720.
Jespersen, S.T., Baudry, F., Wakeman, M.D., Michaud, V., Blanchard, P., Norris, R., and Manson, J-A.E., "Consolidation of Net-shape Random Fiber Thermoplastic Composite Preforms," Apr. 2010, Polymer Composites 2010, pp. 655-656, along with explanation provided with Third Party Observation.

* cited by examiner

METHOD FOR MANUFACTURING SHAPED PRODUCT WITH MAINTAINED ISOTROPHY

CROSS REFERENCE TO RELATED APPLICATIONS

This is a continuation of U.S. application Ser. No. 14/091,782, filed Nov. 27, 2013, which is a continuation of International Application No. PCT/JP2012/063731 filed on May 29, 2012, which claims priority from Japanese Patent Application No. 2011-122120, filed on May 31, 2011, the entire disclosures of which are incorporated herein by reference.

TECHNICAL FIELD

The present invention relates to a method for manufacturing a shaped product constituted by a fiber-reinforced composite material formed from a random mat including reinforcing fibers and a thermoplastic resin, the random mat is a starting material. More specifically, the present invention relates to a method for manufacturing a shaped product, the method capable of obtaining a shaped product with maintained isotropy of the reinforcing fibers to the end thereof even in a case of being press-molded by closing a mold under a condition in which the charge ratio of a prepreg to the mold is 100% or less.

BACKGROUND ART

A fiber-reinforced composite material in which carbon fibers, aramid fibers, glass fibers or the like are used as reinforcing fibers has been widely utilized for structural materials of aircrafts, vehicles or the like, or in general industries and sports such as a tennis racket, a golf club shaft and a fishing rod by utilizing high specific strength and high specific elasticity thereof.

In molding a shaped product constituted by the fiber-reinforced composite material, it has been proposed that base materials including discontinuous reinforcing fibers and a resin are layered to prepare a preform, the preform is arranged in a wider range than a total mold cavity area, and the perform is press-molded. See Japanese Patent Laid-Open Publication No. 2010-253938.

However, in this molding method, the outer periphery portion of the shaped product is required to be trimmed. For this reason, a large amount of offcuts are produced, and the disposal thereof incurs costs. In order to obtain an integrated shaped product that substantially exhibits isotropy, it must be careful to ensure that symmetrically layering is always made, and thus the discretion degree of the time for preparing perform and the arrangement method in molding is low.

Also, a method of obtaining a shaped product constituted by a fiber-reinforced composite by molding a composition including reinforcing fibers and a resin through injection molding is performed. See Japanese Patent Laid-Open Publication H04-193504. However, this method employs so-called long fiber composite pellets, in which an average length of the reinforcing fibers ranges from about 5 mm to 15 mm, and the length of the reinforcing fibers is largely reduced in the shaped product after the injection molding.

SUMMARY OF INVENTION

Problems to be Solved

An object of the present invention is to provide a method for manufacturing a shaped product from a random mat including reinforcing fibers and a thermoplastic resin, the method which may obtain a shaped product in which isotropy of the reinforcing fibers is maintained to the end thereof even in a case of being press-molded under a condition in which the charge ratio of a prepreg to a mold is low.

Means for Solving the Problems

The inventors of the present invention found that the above-described problem may be solved when a prepreg obtained by impregnating a specific random mat type of reinforcing fibers with a thermoplastic resin is molded under a specific condition, and then completed the present invention.

That is, the present invention provides a method for manufacturing a shaped product constituted by a fiber-reinforced composite material, the method including:

1) a prepreg preparation step of obtaining a prepreg in which a random mat including reinforcing fibers with an average fiber length of 5 mm to 100 mm and a thermoplastic resin is heated up to a temperature of a melting point or more and less than a thermal decomposition temperature in a case where the thermoplastic resin is crystalline, or up to a temperature of a glass transition temperature or more and less than a thermal decomposition temperature in a case where the thermoplastic resin is amorphous such that the random mat is impregnated with the thermoplastic resin;

2) a prepreg arranging step in which the prepreg that is set at the temperature of the melting point or more and less than the thermal decomposition temperature in the case where the thermoplastic resin is crystalline, or at the temperature of the glass transition temperature or more and less than the thermal decomposition temperature in the case where the thermoplastic resin is amorphous is arranged in a mold which is controlled to a temperature less than the melting point temperature in the case where the thermoplastic resin is crystalline or a temperature less than the glass transition temperature in the case where the thermoplastic resin is amorphous such that a charge ratio represented by equation (3) is 50% or more and 100% or less; and 3) a molding step in which the prepreg is pressurized within the mold and at the same time, the molding is completed at a temperature less than the melting point in the case where the thermoplastic resin is crystalline, or at a temperature less than the glass transition temperature in the case where the thermoplastic resin is amorphous, to obtain the shaped product, in which the random mat includes the reinforcing fibers which are substantially two-dimensionally randomly oriented at a fiber areal weight of 25 $g/m^2$ to 10000 $g/m^2$, reinforcing fiber bundles (A) constituted by the reinforcing fibers of a critical single fiber number or more, the critical single fiber number defined by equation (1), are included in an amount of 20 Vol % or more and less than 99 Vol % with respect to the total amount of the reinforcing fibers in the random mat, and an average number of the reinforcing fibers (N) in the reinforcing fiber bundles (A) satisfies equation (2).

$$\text{critical single fiber number} = 600/D \quad (1)$$

$$0.7 \times 10^4/D^2 < N < 1 \times 10^5/D^2 \quad (2)$$

(In equation (1) and equation (2), D represents an average fiber diameter (μm) of single reinforcing fibers)

$$\text{charge ratio (\%)} = 100 \times [\text{base material area (mm}^2)/\text{mold cavity projection area (mm}^2)] \quad (3)$$

(In equation (3), a base material area represents a projection area of all the arranged prepreg in a draft direction, and a mold cavity projection area represents a projection area in a draft direction.)

Effect of Invention

According to the manufacturing method of the present invention, a shaped product may be molded by using a required minimum material, and it is possible to obtain a shaped product of which isotropy of the reinforcing fibers is maintained to the end thereof even in a case of being press-molded under a condition in which the charge ratio of a prepreg to a mold is 100% or less. Accordingly, according to the present invention, a trimming step may be omitted, and thus it is possible to largely reduce a disposal material and reduce the cost associated with that.

Also, according to the manufacturing method of the present invention, a shaped product being thin, lightweight and highly rigid, the shaped product excellent in surface appearance may be obtained, and an occupation time in a mold may be reduced due to cold press, and thus it is possible to manufacture the shaped product with a high productivity.

Further, according to the manufacturing method of the present invention, even when a mold with a complicated three-dimensional shape is used, a shaped product with a good shape follow-up property may be obtained, and thus it is possible to manufacture the shaped product within a short time, and at the same time to obtain the shaped product that does not require trimming to a product shape.

EXEMPLARY EMBODIMENTS OF INVENTION

Figure 1:
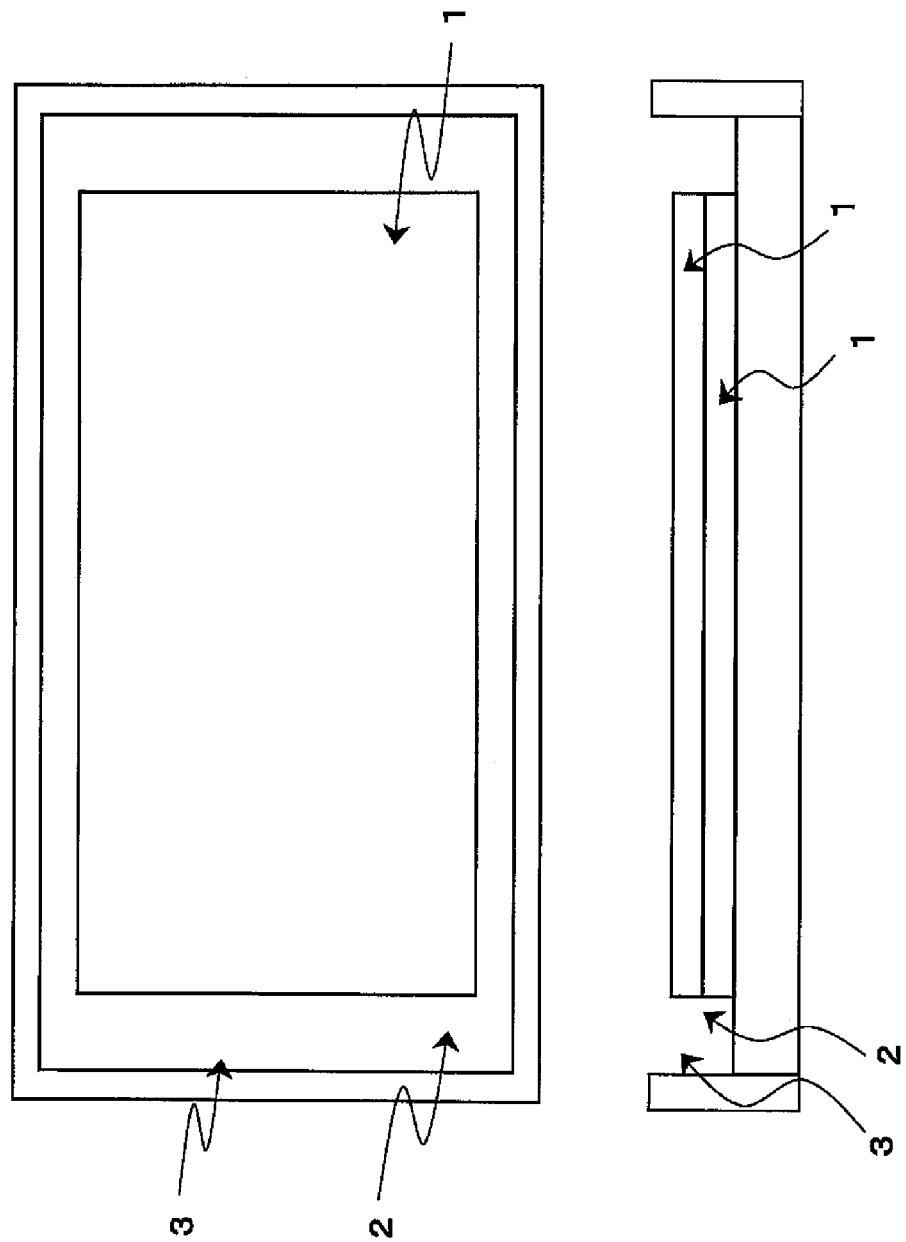
FIG. 1 is a schematic view illustrating arrangement of base materials within a mold in Examples 1 and 3.

Hereinafter, exemplary embodiments of the present invention will be sequentially described, but the present invention is not limited thereto.

The present invention provides a method for manufacturing a shaped product constituted by a fiber-reinforced composite material, the method including:

1) a prepreg preparation step of obtaining a prepreg in which a random mat including reinforcing fibers with an average fiber length of 5 mm to 100 mm and a thermoplastic resin is heated up to a temperature of a melting point or more and less than a thermal decomposition temperature in a case where the thermoplastic resin is crystalline, or up to a temperature of a glass transition temperature or more and less than a thermal decomposition temperature in a case where the thermoplastic resin is amorphous such that the random mat is impregnated with the thermoplastic resin;

2) a prepreg arranging step in which the prepreg that is set at the temperature of the melting point or more and less than the thermal decomposition temperature in the case where the thermoplastic resin is crystalline, or at the temperature of the glass transition temperature or more and less than the thermal decomposition temperature in the case where the thermoplastic resin is amorphous is arranged in a mold which is controlled to a temperature less than the melting point temperature in the case where the thermoplastic resin is crystalline or a temperature less than the glass transition temperature in the case where the thermoplastic resin is amorphous such that a charge ratio represented by equation (3) is 50% or more and 100% or less; and 3) a molding step in which the prepreg is pressurized within the mold and at the same time, the molding is completed at a temperature less than the melting point in the case where the thermoplastic resin is crystalline, or at a temperature less than the glass transition temperature in the case where the thermoplastic resin is amorphous, to obtain the shaped product.

$$\text{charge ratio (\%)} = 100 \times [\text{base material area (mm}^2\text{)} / \text{mold cavity projection area (mm}^2\text{)}] \quad (3)$$

(In equation (3), a base material area represents a projection area of all the arranged prepreg in a draft direction, and a mold cavity projection area represents a projection area in a draft direction.)

[Shaped Product]

The shaped product obtained by the manufacturing method of the present invention is a shaped product constituted by a fiber-reinforced composite material including reinforcing fibers and a thermoplastic resin. The shaped product obtained in the present invention has a layer that is two-dimensionally randomly oriented in-plane, and shows substantial isotropy in-plane.

Here, "substantial isotropy" referred in the present invention is defined as that after molding a composite material, when a tensile test is performed based on an arbitrary direction of a molded plate and a perpendicular direction thereto, tensile modulus in the respective directions are measured, and the ratio (Eδ) obtained by dividing a larger value by a smaller value among the measured values of tensile modulus is 1.3 or less.

The shaped product obtained by the manufacturing method of the present invention is a shaped product that has a smooth surface, and a uniform thickness. Meanwhile, variation in thickness of the shaped product is preferably within ±10% from the average value thereof. Here, "smooth surface" means that when the surface of the shaped product is visually confirmed, rough shapes, wrinkles, unevenness, is not observed and the shaped product is a flat and smooth state.

The shaped product obtained in the present invention is obtained by using a random mat including reinforcing fibers and a thermoplastic resin as a starting material through the form of a prepreg. In the shaped product obtained finally, the average fiber length of the used reinforcing fibers and a ratio of reinforcing fiber bundles and single fibers are maintained in a state in the random mat as the starting material.

[Reinforcing Fibers]

(Kind)

The reinforcing fibers used in the present invention are preferably at least one kind selected from the group consisting of a carbon fiber, an aramid fiber and a glass fiber. They may be used in combination, and the carbon fiber is preferably used from the viewpoint of providing a composite material that is lightweight and excellent in strength.

As for the reinforcing fibers used in the present invention, those added with a sizing agent are preferably used, and the sizing agent is preferably added in an amount of 0 to 10 parts by mass based on 100 parts by mass of the reinforcing fibers.

(Average Fiber Length)

Meanwhile, when the carbon fibers are used in the present invention, the average fiber diameter is preferably 3 μm to 12 μm, and more preferably 5 μm to 7 μm.

The reinforcing fibers used in the present invention are discontinuous, and have an average fiber length of 5 mm to 100 mm. The manufacturing method of the present invention is characterized in that it is possible to obtain a shaped product which may develop a reinforcing function even if long reinforcing fibers are included therein. The average fiber length of the reinforcing fibers is preferably 10 mm to 100 mm, more preferably 10 mm to 50 mm, and further more preferably from 10 mm to 30 mm. Meanwhile, by employing a preferred cutting method of the reinforcing fibers to be described later, the length of the reinforcing fibers that constitute the random mat may be fixed.

(Fiber Areal Weight of Reinforcing Fibers)

In the random mat, the fiber areal weight of the reinforcing fibers is 25 g/m$^2$ to 10,000 g/m$^2$, preferably 25 g/m$^2$ to 6,000 g/m$^2$, and more preferably 25 g/m$^2$ to 3,000 g/m$^2$. When the fiber areal weight is less than 25 g/m$^2$, distribution of the reinforcing fibers in the random mat tends to be uneven, and a sufficient reinforcing effect may not be developed. Meanwhile, when the fiber areal weight is greater than 10,000 g/m$^2$, it is difficult to impregnate a prepreg with the resin at the time of manufacturing the prepreg due to the excessive amount of the reinforcing fibers, and thus voids to be defects within the shaped product tend to easily occur. Further, as compared to the thermoplastic resin, the reinforcing fibers have a large specific gravity, and thus the shaped product becomes heavy.

(Volume Fraction of Reinforcing Fibers)

As for a content of the reinforcing fibers of the random mat used in the present invention and the shaped product obtained therefrom, a volume fraction (Vf) of the reinforcing fibers defined by equation (5) is preferably 5 Vol % to 80 Vol %.

volume fraction (Vf) of the reinforcing fibers=100× [volume of the reinforcing fibers/(volume of the reinforcing fibers+volume of the thermoplastic resin)]     (5)

The volume fraction (Vf) of the reinforcing fibers represents a composition of the reinforcing fibers and the thermoplastic resin included in the fiber-reinforced composite material (random mat) and the shaped product obtained from the composite material (random mat). When the volume fraction of the reinforcing fibers is lower than 5% Vol, a reinforcing effect may not be sufficiently developed. Meanwhile, when the volume fraction is greater than 80 Vol %, voids may easily occur at the time of manufacturing a prepreg, and thus the physical property of the obtained shaped product may be reduced. The volume fraction of the reinforcing fibers is preferably 20 Vol % to 60 Vol %.

Here, in an example of a specific method of calculating the forgoing volume fraction (Vf) of the reinforcing fibers, for example, the following method is exemplified. In the method, mass values of the reinforcing fibers and the thermoplastic resin remaining after removing the thermoplastic resin from a specimen of a shaped product are obtained respectively, and the values is converted into volumes by using densities of the respective components, and the volume values are substituted in the equation (5) above to obtain the volume fraction (Vf) of the reinforcing fibers.

[Thermoplastic Resin]

(Kind)

The kind of the thermoplastic resin used in the present invention may be, for example, a vinyl chloride resin, a vinylidene chloride resin, a polyvinyl acetate resin, a polyvinyl alcohol resin, a polystyrene resin, an acrylonitrile-styrene resin (AS resin), an acrylonitrile-butadiene-styrene resin (ABS resin), an acrylic resin, a methacrylic resin, a polyethylene resin, a polypropylene resin, a polyamide 6 resin, a polyamide 11 resin, a polyamide 12 resin, a polyamide 46 resin, a polyamide 66 resin, a polyamide 610 resin, a polyacetal resin, a polycarbonate resin, a polyethyleneterephthalate resin, a polyethylene naphthalate resin, a polybutylene terephthalate resin, a polyarylate resin, a polyphenylene ether resin, a polyphenylene sulfide resin, a polysulfone resin, a polyethersulfone resin, and a polyetherether ketone resin, a polylactic acid resin, and so on. Meanwhile, two or more kinds of thermoplastic resins may be used in combination.

(Shape)

The form of the thermoplastic resin is not particularly limited, and for example, the thermoplastic resin may be provided in a fibrous form, a particulate form, a molten state, or further provided in a mixture thereof.

In the case of the thermoplastic resin in the fibrous form, the fineness is preferably 100 dtex to 5,000 dtex, more preferably 1,000 dtex to 2,000 dtex. The average fiber length is preferably 0.5 mm to 50 mm, and more preferably 1 mm to 10 mm.

In the case where the thermoplastic resin is in the particulate form, it is preferably a spherical, strip or cylindrical (e.g., pellet) shape. In the case of the spherical shape, it may be preferably a rotating body of a perfect circle or an ellipse, or an egg-like shape. In the case of the spherical shape, the average particle diameter is preferably 0.01 μm to 1,000 μm. The average particle diameter is more preferably 0.1 μm to 900 μm, and further more preferably 1 μm to 800 μm. There is no particular limitation on the distribution of the particle diameters, but for the purpose of obtaining a thinner shaped product, a sharp distribution is preferred. Meanwhile, by an operation such as classification, a desired particle size distribution may be achieved for use.

In the case where the thermoplastic resin is in the strip form, it is preferably a cylindrical (e.g., pellet), prismatic or scaly-piece shape. In this case, the aspect ratio of a certain extent may be employed, but the preferred length may be almost the same as that in the fibrous form.

(Content of Thermoplastic Resin)

The content of the thermoplastic resin in the random mat as the starting material and the shaped product obtained therefrom is preferably 50 parts to 1000 parts by mass, more preferably 50 parts to 500 parts by mass based on 100 parts by mass of the reinforcing fibers. When the content is less than 50 parts by mass, voids may easily occur at the time of manufacturing a prepreg due to the thermoplastic resin in a small amount, and thus the physical property of the obtained shaped product may be deteriorated. When the content is greater than 1,000 parts by mass, the ratio of reinforcing fibers becomes relatively low, and thus expected physical properties in the shaped product constituted by the fiber-reinforced composite material may not be achieved.

[Other Components]

The random mat used in the manufacturing method of the present invention may be any one that includes at least the reinforcing fibers and the thermoplastic resin as described above, but may include the other third component within a limitation that does not impair the object.

Examples of other components may include various kinds of fibrous or non-fibrous fillers other than the above described reinforcing fibers, a flame retardant, an anti-UV agent, a pigment, a releasing agent, a softening agent, a plasticizer and a surfactant. Especially, since electronic/electrical equipment applications or automotive applications may require high flame retardancy, the thermoplastic resin preferably contains a flame retardant. Examples of the flame retardant may include those conventionally known but are not especially limited as long as it may impart flame retardancy. Specifically, the examples may include a phosphorous-based flame retardant, a nitrogen-based flame retardant, a silicone compound, an organic alkali metal salt, an organic alkali earth metal salt, or a bromine-based flame retardant, and these flame retardants may be used alone or in combination thereof. The content of the flame retardant is preferably 1 part to 40 parts by mass, and more preferably 1 part to 20 parts by mass with respect to 100 parts by mass of the thermoplastic resin in consideration of balance of a physical property, a moldability, and a flame retardancy.

[Random Mat]

The random mat used in the present invention has the reinforcing fibers which are substantially two-dimensionally randomly oriented. Here, "two-dimensionally randomly" means that the reinforcing fibers are not aligned in-plane in a specific direction, but are oriented in-plane in random directions.

(Ratio of Reinforcing fiber Bundles (A): Degree of Fiber-Opening of Reinforcing Fibers in Random Mat)

The random mat used in the present invention is characterized in that the ratio of reinforcing fiber bundles (A) constituted by the reinforcing fibers of the critical single fiber number or less, the critical single fiber number defined by equation (1) is 20 Vol % or more and less than 99 Vol % with respect to the total amount of the reinforcing fibers in the random mat.

$$\text{critical single fiber number} = 600/D \quad (1)$$

(In equation (1), D represents an average fiber diameter (μm) of the reinforcing fibers.)

The reinforcing fibers are present in the mat not only in the form of reinforcing fiber bundles (A), but also in the form of single fibers or fiber bundles having the reinforcing fibers of a critical single fiber number or less. Accordingly, the random mat used in the present invention is characterized in that it includes the reinforcing fiber bundles (A) constituted by the reinforcing fibers of a certain number or more, and other reinforcing fibers in a specific ratio by controlling the fiber-opening degree of the reinforcing fiber bundles.

When the existing amount of the reinforcing fiber bundles (A) with respect to the total amount of the reinforcing fibers is less than 20 Vol %, it is difficult to flow the reinforcing fibers within a mold at the time of molding the random mat. Thus, the fibers may not be filled up to ends of a mold cavity, and thus it is difficult to obtain a shaped product according to a designed dimension. Meanwhile, when the existing amount of the reinforcing fiber bundles (A) is 99 Vol % or more, entangled portions of the reinforcing fibers becomes locally thick, and thus a thin-walled product may not be obtained. The existing amount of the reinforcing fiber bundles (A) with respect to the total amount of the reinforcing fibers is preferably 30 Vol % or more and less than 90 Vol %, and more preferably 30 Vol % or more and less than 80 Vol %.

The existing amount of the reinforcing fiber bundles (A) may be controlled by combining conditions of a widening step, a slit step, a cutting step, and a fiber-opening step, for example, in the manufacturing method as described later.

(Average Number of Fibers (N) in Reinforcing Fiber Bundles (A))

It is characterized in that the average number of the fibers (N) in the reinforcing fiber bundles (A) satisfies the equation (2).

$$0.7 \times 10^4/D^2 < N < 1 \times 10^5/D^2 \quad (2)$$

(In equation (2), D represents an average fiber diameter (μm) of the reinforcing fibers.)

Specifically, when the average fiber diameter of the carbon fibers that constitute the random mat is 5 μm to 7 μm, the critical single fiber number is 86 to 120, and when the average fiber diameter of the carbon fibers is 5 μm, the average number of the fibers (N) in the reinforcing fiber bundles (A) is 280 to 4,000. When the average fiber diameter of the carbon fibers is 5 μm, the average number of the fibers (N) in the reinforcing fiber bundles (A) is preferably 280 to 2,000, and more preferably 600 to 1,600. When the average fiber diameter of the carbon fibers is 7 μm, the average number of the fibers (N) in the reinforcing fiber bundles (A) is 142 to 2,040. When the average fiber diameter of the carbon fibers is 7 μm, the average number is preferably 142 to 1,020, and more preferably 300 to 800.

When the average number of the fibers (N) in the reinforcing fiber bundles (A) is $0.7 \times 10^4/D^2$ or less, it is difficult to obtain a high fiber volume fraction (Vf). When the average number of the fibers (N) in the reinforcing fiber bundles (A) is $1 \times 10^5/D^2$ or more, a thick portion may locally occur in composite materials, which is liable to cause voids.

When a thin-walled shaped product having a thickness of 1 mm or less is intended to be obtained, use of fibers only simply separated results in a large unevenness in fiber areal weight to fail to obtain good physical properties. Further, when all fibers are opened, it may be easy to obtain a thinner one. However, entanglement of fibers increases to fail to obtain one having a high volume fraction (Vf) of the reinforcing fibers. It becomes possible to obtain the random mat which is thin in thickness and excellent in physical properties, by using a random mat in which the reinforcing fiber bundle (A) constituted by the reinforcing fibers of the critical single fiber number or more, the critical single fiber number defined by formula (I), and reinforcing fibers (B) in a state of individual single fibers or thinner fiber bundles constituted by the reinforcing fibers of less than the critical single fiber number are present at the same time.

It is possible to adjust the random mat of the invention to various thicknesses, and by using this one as a preform, a thin-walled shaped product having a thickness of about 0.2 to 1 mm can also be suitably obtained. That is to say, according to the invention, by preparing the random mat conformed to thickness of various desired shaped products, it can be obtained a thin-walled shaped product such as a surface layer of a sandwich material.

Meanwhile, the average number of the fibers (N) in the reinforcing fiber bundles (A) may be controlled through combination of conditions of a widening step, a slit step, a cutting step, and a fiber-opening step, for example, in the manufacturing method as described later.

[Manufacturing Method of Random Mat]

The manufacturing method of a random mat is not particularly limited. For example, in the manufacturing, a thermoplastic resin in a fibrous form and/or a particulate form may be present to be mixed with reinforcing fibers, or a random mat that does not include a matrix resin component may be supplied with a molten thermoplastic resin.

Hereinafter, a preferred manufacturing method of a random mat will be described. The manufacturing method of random mat may be preferably a method for carrying out the following respective steps (I), (III), (IV), (V) or (V'), or further more preferably a method for carrying out step (II) between steps (I) and (III). By sequentially performing these steps, it is possible to manufacture a random mat with a particularly good isotropy, and further a shaped product from the random mat.

(I) Reinforcing Fiber Strand Supply Step

In a reinforcing fiber strand supply step, respective yarn of reinforcing fibers are drawn from a plurality of reinforcing fiber-wound yarn bodies arranged on a creel section, and are supplied a reinforcing fiber strand that are formed by yarns alone or a plurality of single fibers which are pulled and aligned. Here, the strand width is preferably 10 mm to 50 mm (especially, 20 mm to 30 mm) When the width of the strand of the reinforcing fibers to be supplied is small, the width may be widened up to a predetermined width in the strand supply step if necessary such that a thin and widened strand may be supplied. The operation of widening the width may be performed by, for example, bringing the strand in contact with a roller or a bar for widening.

(II) Strand Slit Step

In the strand slit step, the supplied reinforcing fiber strand is continuously slit preferably in parallel to a strand length direction (that is, along the fiber axis direction) to obtain a plurality of fine strands with a strand width of 0.05 mm to 5 mm, preferably 0.1 mm to 1.0 mm. Specifically, the widened strand continuously transferred from the previous step may be continuously cut in a vertical direction by using a vertical slitter with blades parallel to the fiber axis direction, or may split into a plurality of strands by providing one or a plurality of split guides in a transfer path of the widened strand. In this step, a guide or bar for widening may be provided on the line such that the reinforcing fibers may be slit while being widened.

(III) Reinforcing Fiber Cutting Step

Then, in the reinforcing fiber cutting step, strands that are not slit or the reinforcing fiber strands with fine width which are slit as described above are cut to an average fiber length of 5 mm to 100 mm. Meanwhile, the "average fiber length" referred to herein may be determined by measuring fiber lengths of randomly extracted 100 fibers to a unit of 1 mm by using, for example, a vernier caliper, and obtaining the average thereof. In general, the average fiber length corresponds to a cutting interval of strands through a cutter.

A device used for cutting the reinforcing fibers to an average fiber length of 5 mm to 100 mm is preferably a rotary cutter. Especially, a rotary cutter equipped with a spiral knife having a specific angle is preferred. A knife angle for continuously cutting the reinforcing fibers may be geometrically calculated from the width of the reinforcing fibers to be used or the average fiber length of the cut fibers, and the relationship thereof preferably satisfies the following condition.

> average fiber length of reinforcing fibers (pitch of blades)=strand width of reinforcing fiber×tan (90−Θ) (here, Θ represents an angle formed by the arrangement direction of a knife and the circumferential direction.)

For example, when a cutter with a knife intersecting a fiber axis direction and a knife parallel to the fiber axis direction is used, a fiber bundle may be slit in a vertical direction while being cut into a specific fiber length. When such a cutter is used, the strand slit step (II) and the reinforcing fiber cutting (III) may be performed at once.

(IV) Reinforcing Fiber Opening Step

In the reinforcing fiber opening step, a gas is sprayed to the strands of the reinforcing fibers cut into a predetermined fiber length (hereinafter, may be referred to as "strand pieces") such that the strand pieces are opened to separate fiber bundles with a required size (the number of fiber bundles).

Specifically, in the reinforcing fiber opening step (IV), the strand pieces are introduced into a path, and the gas such as air is sprayed to the strand pieces passing through the path such that the strand pieces are separated into a required bundle size while being spread in the gas. The degree of fiber-opening may be appropriately controlled by, for example, pressure of the sprayed gas.

As a preferred exemplary embodiment, for example, there may be a method of appropriately opening the reinforcing fibers by providing an air spray nozzle in middle or the front end of the path and directly spraying air to the strand pieces at a wind velocity of 5 m/sec to 500 m/sec from the compressed air spraying hole. Specifically, there may be a method using an air spray nozzle, the method in which a plurality of holes with a diameter of about 1 mm are provided in the path where the reinforcing fiber pieces pass, and a pressure of about 0.2 MPa to 0.8 MPa is applied from the outside such that compressed air is directly sprayed to the strand pieces from the holes.

In the reinforcing fiber opening step, all fibers constituting the strand pieces are not opened to separate from each other and completely separated up to the form of single fibers. Some fibers are opened to be the form of single fiber or the form of almost single fiber, but many fibers are required to be adjusted such that they constitute fiber bundles in which a predetermined number or more of single fibers are bundled. That is, the degree of fiber-opening is required to satisfy the existing amount of reinforcing fiber bundle (A) having the reinforcing fibers of the critical single fiber number or more, the critical single fiber number defined by equation (1), and the average number of the fibers (N) in the reinforcing fiber bundle (A).

(V) Random Mat Forming Step

In the random mat forming step, the cut and fiber-opened reinforcing fibers are spread in the air and at the same time, the thermoplastic resin in the form of powder or short fibers (hereinafter, they are generically referred to as "thermoplastic resin particles or the like") is supplied such that the reinforcing fibers together with the thermoplastic resin particles or the like may be sprayed on a breathable support provided below a fiber-opening device, and thus the reinforcing fibers and the thermoplastic resin particles or the like are mixed on the support and deposited/fixed to a predetermined thickness to form a random mat.

In the random mat forming step, the thermoplastic resin particles or the like are preferably supplied in a separate path from one of the reinforcing fibers opened by air, and they are sprayed at once toward the breathable support, and then deposited on the breathable support in a mat shape in a state where both are substantially uniformly mixed with each other, and fixed it in such a state. In this case, when the breathable support is constituted by a conveyor formed of a net and the deposition is made on the conveyer while continuously moving the conveyer in one direction, a random mat may be continuously formed. Further, uniform deposition may be achieved by moving the support in back and forth, left and right directions.

In the random mat forming step, the reinforcing fibers and the thermoplastic resin particles or the like are preferably sprayed to be two-dimensionally randomly oriented. In order to spray the fiber-opened reinforcing fibers to be two-dimensionally oriented, a tapered tube of, for example, conical shape that is expanded to the downstream side is preferably used. Within the tapered tube, because the gas sprayed to the reinforcing fibers is diffused and the flow rate within the tube is decreased, and thus a rotational force is applied to the reinforcing fibers. By using this Venturi effect, the fiber-opened reinforcing fibers may be uniformly sprayed, without unevenness, together with the thermoplastic resin particles or the like. Further, for the fixing step to be described later, it is desirable that the fiber-opened reinforcing fibers are sprayed on a movable breathable support having a suction mechanism at the lower side thereof (e.g., a net conveyor) and deposited in a random mat form.

In the random mat forming step, the supply amount of the thermoplastic resin is preferably 50 parts to 1,000 parts by mass with respect to 100 parts by mass of the reinforcing fibers, more preferably 50 parts to 500 parts by mass with respect to 100 parts by mass of the reinforcing fibers, and further more preferably 60 parts to 300 parts by mass.

The random mat forming step includes a step of fixing the reinforcing fibers and the thermoplastic resin. The fixing step is a step of fixing the deposited reinforcing fibers and thermoplastic resin particles or the like. For example, there is a method of fixing the reinforcing fibers by suctioning air from the bottom side of the breathable support. The thermoplastic resin that is sprayed together with the reinforcing fibers may be fixed by air suction in a case where thermoplastic resin is in the fibrous form, or may be fixed along with the reinforcing fibers even in a case where the thermoplastic resin is in the particulate form.

By suctioning from the bottom side of the deposition surface in this manner, a mat with a high degree of two-dimensional orientation may be obtained. In the random mat obtained in this manner, the thermoplastic resin particles or the like uniformly exist at or in the vicinity of gaps of the reinforcing fibers constituting the random mat. Thus, in the heating, impregnating, and pressurizing steps to be described later, moving distance of the resin is short, and the impregnation of the resin is enabled in a relatively short time.

Meanwhile, when the thermoplastic resin particles or the like partly pass through the support not to be deposited due to large openings of the sheet or the net constituting the breathable support, for example, a non-woven fabric may be set on the surface of the support, and the reinforcing fibers and the thermoplastic resin particles or the like may be sprayed on the non-woven fabric to be fixed.

After cutting the reinforcing fiber strands into a predetermined length, the strand pieces and the reinforcing fibers separated to be the form of single fibers by cutting may be supplied to a transport path for suction-conveyance, and air may be sprayed to the reinforcing fibers from an air spray nozzle provided in middle or front end of the transport path such that the cut strand pieces may be separated and opened into reinforcing fiber bundles with a required size (thickness), and at the same time, the reinforcing fibers together with the thermoplastic resin particles or the like may be sprayed to the surface of a breathable support (hereinafter, may be referred to as "fixing net") that moves continuously or intermittently in a predetermined direction, and deposited and fixed to form a random mat.

As described above, since the reinforcing fibers and the thermoplastic resin in powder and/or fibrous form are present in unevenness mixed state in the random mat, it is not necessary to largely flow the fibers and the resin within a mold. Thus, there is an advantage in that impregnation of the thermoplastic resin may be easily performed. As a result, in the obtained shaped product, the isotropy of the reinforcing fibers in the random mat may be maintained.

(V') Random Mat Forming Step (Second Example)

As another random mat forming step, a method of obtaining a random mat constituted by the reinforcing fibers in the same manner as in the random mat forming step (V), except that a matrix resin is not included, supplying the thermoplastic resin in a molten state to the random mat to form a random mat including the reinforcing fibers and the thermoplastic resin. In such a method, for example, fiber-opened reinforcing fiber strands obtained from the reinforcing fibers opening step (VI) may be deposited in the mat form, and at the same time, the thermoplastic resin in a molten state is ejected as a film-form molten body from a die provided above, and then the thermoplastic resin may be supplied to the deposited mat to impregnate the almost entire surface of the mat with the thermoplastic resin.

In this method, a preferred method of depositing the reinforcing fiber strands in the mat form is the same as that described in (V) above. The supply amount of the thermoplastic resin is also the same as that in (V) above, but it is preferable to adjust the amount of the thermoplastic resin in a molten state that is extruded from a die, specifically, the thickness, extrusion rate, and the like, of a film in a case of supply in a film-form from the die.

[Prepreg Preparation Step]

In the prepreg preparation step of the present invention, the random mat is heated up to a temperature of a melting point or more and less than a thermal decomposition temperature in a case where the thermoplastic resin included in the random mat is crystalline, or heated up to a temperature of a glass transition temperature or more and less than a thermal decomposition temperature in a case where the thermoplastic resin is amorphous, and is impregnated with the thermoplastic resin to obtain a prepreg. Meanwhile, the thermoplastic resin may be partially molten to be welded.

[Prepreg]

(Form of Reinforcing fibers in Prepreg)

The form of reinforcing fibers in the prepreg is maintained in the same state as that in the random mat. That is, the reinforcing fibers within the prepreg are maintained at the same average fiber length, isotropy, or fiber-opening degree as those in the random mat, and thus may be the same as those described in the random mat.

(Thickness)

The thickness of the prepreg may be 1 to 10 times, preferably 1 to 5 times as thick as the thickness of a shaped product to be obtained. The thickness is not limited, but is preferably 0.1 mm or more. The upper limit is up to a range that allows the prepreg to be molded by when it is arranged in a mold, and the upper limit is substantially about 30 mm.

(Void Fraction)

In order to suppress impregnation failure of a resin at the time of molding a prepreg as much as possible, the void fraction of the prepreg is preferably 0% to 30%. The void fraction of the prepreg may be calculated by observing a cross-section of the prepreg with an optical microscope, and dividing a presence area of voids by a cross-sectional area of the base material for observation. In the present invention, the observation of n=5 per prepreg is made, and the average value is set as a void fraction.

[Prepreg Arranging Step]

In the prepreg arranging step, the obtained prepreg is maintained or re-heated at a temperature of the melting point or more and less than the thermal decomposition temperature in the case where the thermoplastic resin is crystalline, or at a temperature of the glass transition temperature or more and less than the thermal decomposition temperature in the case where the thermoplastic resin is amorphous. The prepreg at the temperature is arranged within a mold which is controlled to a temperature less than the melting point in the case where the thermoplastic resin is crystalline or a temperature less than the glass transition temperature in the case where the thermoplastic resin is amorphous.

Here, for example, the temperature of the prepreg may be measured by a measuring instrument provided outside a heating furnace after a K-type thermocouple is attached on a prepreg surface. The prepreg arranged in the mold may be used as it is without being cooled after being impregnated with the thermoplastic resin in the prepreg preparation step, or may be obtained through a solidifying step and then a re-heating step, after impregnation with the thermoplastic resin.

(Arranging Number and State)

In the prepreg arranging step, for example, as illustrated in FIG. 1, one prepreg or 2 to 10 overlapping prepregs are arranged in a mold cavity. When they are overlapped each other, the prepregs may be partially or fully overlapped each other according to a shaped product to be obtained.

At the time of arranging, it is preferred that all surfaces of ends of the prepregs are not in contact with ends of the mold. When a plurality of prepregs is arranged, the prepregs do not have to be in the same shape, but are required to be partially or fully overlapped each other. For example, they may be arranged in the mold while overlapping the ends of the prepregs. When a shaped product in a large-sized and complicated shape is molded, the overlapping arrangement becomes an effective means. The overlapping may enable offcuts to be effectively used.

There is no special limitation in the size of the overlapping base materials (prepregs), but a required size may be appropriately used according to the shape or size of a required shaped product, and a size is 1 cm² to 30,000 cm² is preferably used. The degree of overlapping is also not specially limited, and may be appropriately set according to the size of the base materials (prepregs).

Figure 9:
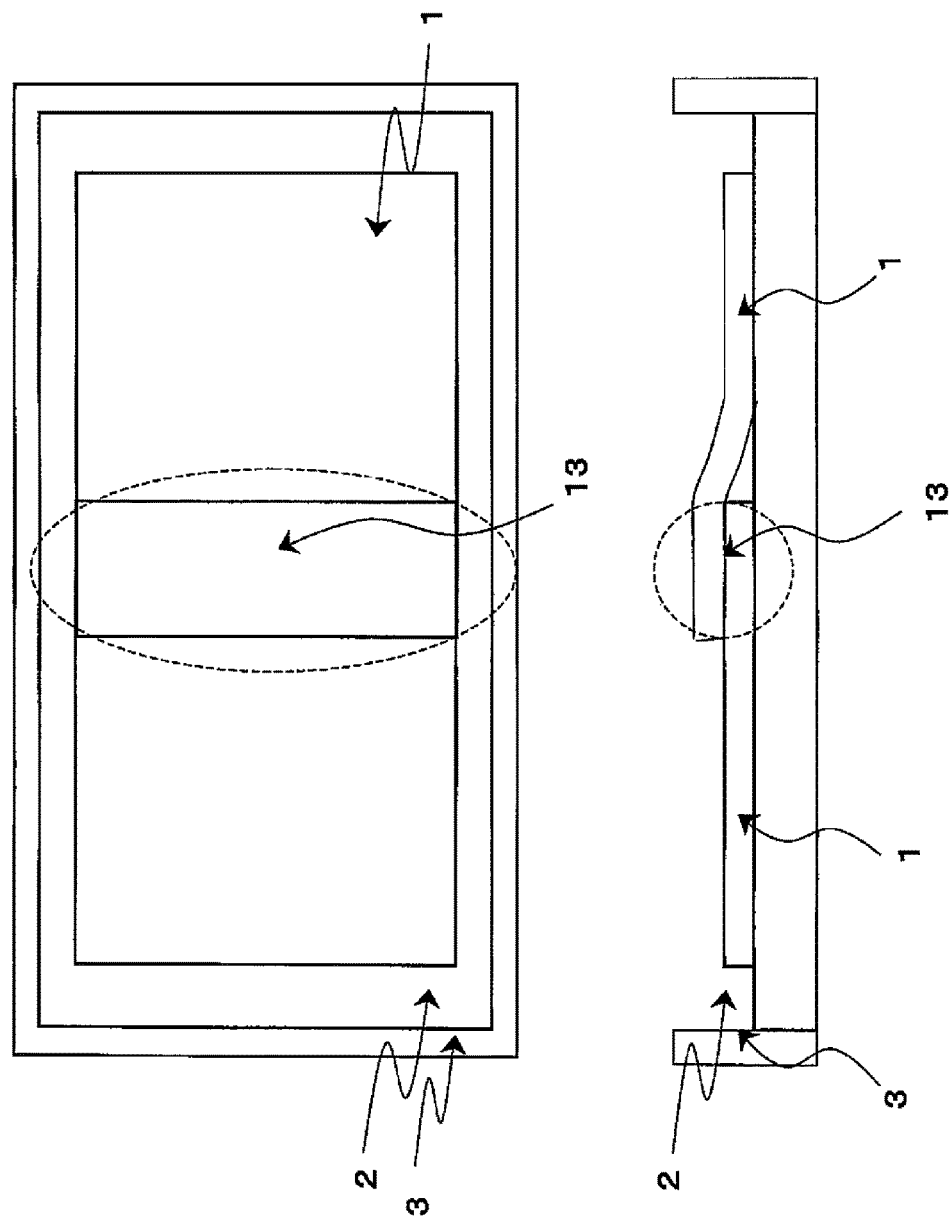
FIG. 9 is a schematic view illustrating arrangement of base materials within a mold in Example 11.

The overlap margin for overlapping the base materials is preferably 1 mm to 100 mm, more preferably from 5 mm to 50 mm. On the overlapping arrangement of ends of base materials (prepregs), additional overlapping arrangement of ends of base materials (prepregs) may be repeatedly layered one or more times. At that time, the number of layers is preferably from 2 to 100. FIG. 9 illustrates an example in a case where ends of the base materials (prepregs) are arranged to be overlapped.

(Mold)

The mold used in the manufacturing method of the present invention is preferably a sealable one, specifically a mold in which a clearance between a core side and a cavity side in a state where the mold is closed is very small. The present invention is a method of obtaining a shaped product through press-molding while causing a prepreg (a base material) to flow within the sealed mold. According to the present invention, a shaped product in which isotropy of the reinforcing fibers is maintained up to the end of the obtained shaped product may be obtained.

Here, the clearance range of the mold to be used is set such that the clearance of ends is preferably 0.01 mm to 0.1 mm, more preferably 0.03 mm to 0.05 mm.

Figure 8:
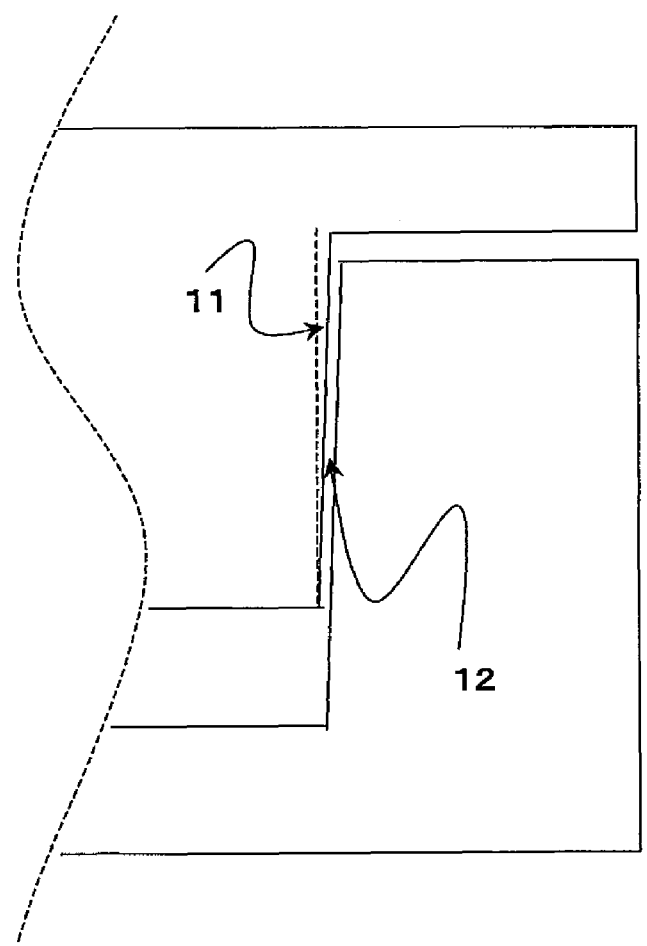
FIG. 8 is an explanatory view illustrating a structure of an end of a mold.

The explanatory view of a structure of an end of a mold used in the present invention is illustrated in FIG. 8. The draft angle of ends is not particularly limited, but is preferably 0° to 10°, and further more preferably 1° to 5°. When the draft angle of ends is 1° or more, it is easy to perform release at the time of taking out a shaped product after molding. Also, when the draft angle of ends is 5° or less, press-molding may be performed through suitable sealing. Further, the draft angle of 5° or less is effective in suppressing the size of the shaped product from unnecessarily increasing.

Further, it is preferable that ends of the core side and the cavity side are formed in a sharp structure, and are trimmable simultaneously with molding. In this case, even when offcuts occur, they may be trimmed simultaneously with molding.

The surface of the mold may be polished according to a surface appearance required for a shaped product to be obtained. When a smooth surface property is required for the shaped product, it is preferably polished with #400 or more.

(Mold Temperature)

The temperature of the mold is preferably not less than a melting point-200° C. and not more than a melting point-10° C. in a case where the thermoplastic resin is crystalline, or preferably not less than a glass transition temperature-200° C. and not more than a glass transition temperature-10° C. in a case where the thermoplastic resin is amorphous.

(Charge Ratio)

In the prepreg arranging step, the random mat is required to be arranged in a mold such that the charge ratio represented by equation (3) is 50% to 100%. In the present invention, when the charge ratio is set to be 50% or more and 100% or less, it is possible to manufacture a lightweight shaped product in a high productivity without material loss or labor for trimming, the shaped product in which a layer including the reinforcing fibers being substantially two-dimensionally oriented in-plane, may be secured.

$$\text{charge ratio (\%)}=100\times[\text{base material area (mm}^2)/\text{mold cavity projection area (mm}^2)] \quad (3)$$

(In equation (3), the base material area represents a projection area of all the arranged prepreg in a draft direction, and the mold cavity projection area represents a projection area in a draft direction.)

In a case where the charge ratio is less than 50%, it is possible to obtain a shaped product with no cracks or wrinkles, and no warpage, the shaped product in which fibers are filled up to ends of the mold, but an area on a horizontal portion where a substantially two-dimensionally randomly oriented layer may not be secured is increased. Thus, there is a tendency that the development rate of physical properties or the surface appearance is degraded.

Meanwhile, in a case where the charge ratio is greater than 100% and the mold has an open cavity structure, it is possible to obtain a shaped product in which fibers are filled up to ends of the mold. However, at the time of molding a product having a complicated shape, controlling is difficult because the thickness is varied due to squeezing or pulling of a material, and especially the end surface tends to be thin. In the product having a shape with thickness deviation, controlling is further difficult. Further, burr occurs at ends of the shaped product, which requires trimming by machine processing as a post processing. This not only makes the step complicated, but also causes a material loss.

In a case where the charge ratio is greater than 100% and the mold has a closed cavity structure, it is possible to obtain a shaped product with no cracks or wrinkles, a good surface appearance, no warpage, and substantial isotropy, the shaped product in which fibers are filled up to ends of the mold, but there occurs a need to trim the end surface portions of the product at ends of the mold. Further, when the product shape is complicated, ends of the mold may firstly come in contact with the prepreg at the time of molding, and thereby suppressing follow-up in the mold. This makes it difficult to control the product thickness.

As described above, the thickness of the prepreg may be appropriately selected according to the thickness of a required shaped product. However, when the charge ratio of the base material (prepreg) in the mold is 50% or more and 80% or less, it is preferable that the thickness of the prepreg or the total thickness of layered prepregs is 1.0 mm or more in order to properly perform the flowing.

(Total Area Charge Ratio)

When a required shaped product takes a three-dimensional shape, the random mat is preferably arranged in a mold such that the total area charge ratio represented by equation (4) is 30% to 100%.

$$\text{total area charge ratio (\%)} = 100 \times [\text{total base material area (mm}^2\text{)}/\text{total mold cavity area (mm}^2\text{)}] \quad (4)$$

(In equation (4), the total base material area represents an area obtained by subtracting area of layered or overlapping portions from projection area of all horizontally spread prepregs, and the total mold cavity area represents the total areas of mold cavity surfaces.)

Figure 2:
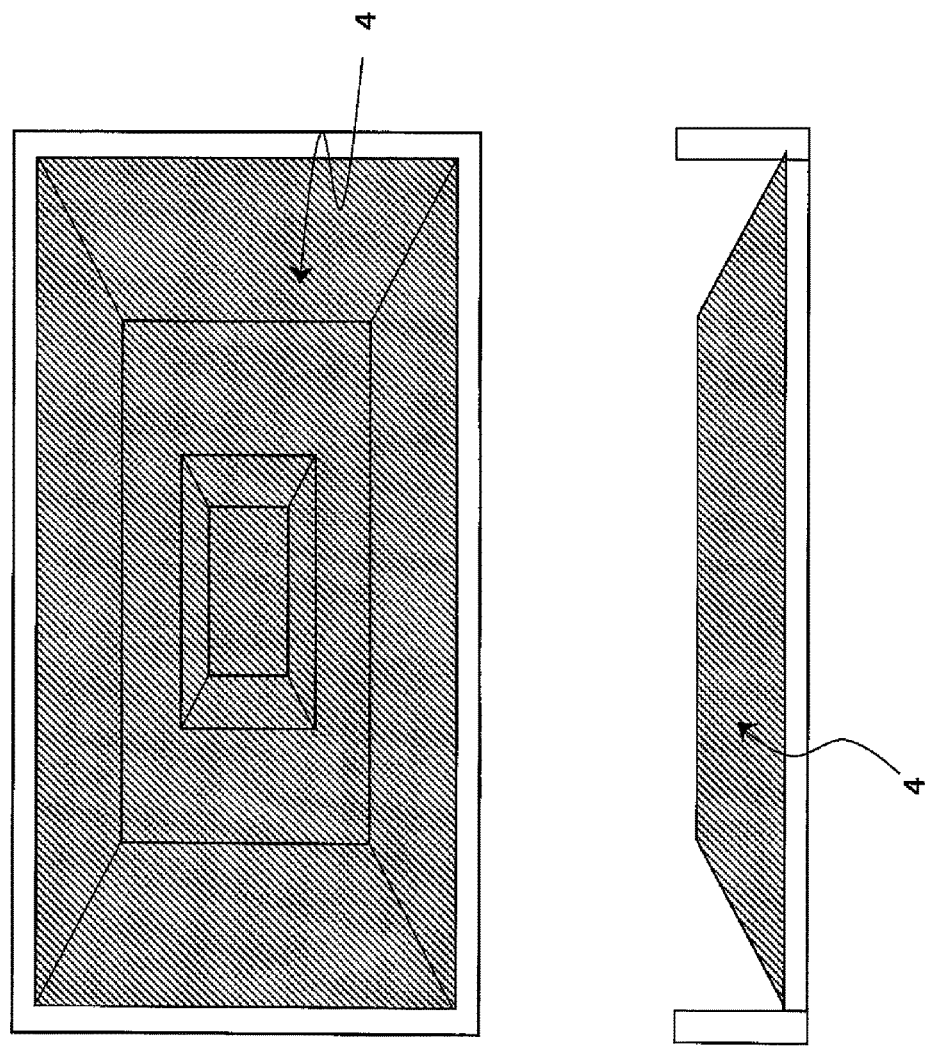
FIG. 2 is a schematic view illustrating a mold with a three-dimensional shape which is used in Example 2.

A top view and a side view of a specific example of a three-dimensional shaped mold are illustrated in FIG. 2. In the drawings, the total of areas of respective mold cavity surfaces indicated by slant-line portions (4) represents the total mold cavity area. Meanwhile, the total area charge ratio has the same value as that of "charge ratio" when the shaped product is formed in a plane shape, such as a flat plate shape.

[Molding Step]

In the molding step, the arranged prepreg is pressurized within the mold, and at the same time, the molding is completed at a temperature less than a melting point in a case where the thermoplastic resin is crystalline, or at a temperature less than a glass transition temperature in a case where the thermoplastic resin is amorphous to obtain a shaped product. That is, by carrying out so-called cold press, the shaped product is manufactured.

Specifically, prepreg is cooled and subjected to press-molding within the mold while performing mold clamping and being pressurized to a target pressure, to complete the molding. That is, the prepreg is pressurized to mold thereto while performing heat exchange, the prepreg is cooled to a temperature less than a melting point in a case where the thermoplastic resin is crystalline or a temperature less than a glass transition temperature in a case where the thermoplastic resin is amorphous. Then, the mold is opened to obtain the shaped product. There is no particular limitation in the cooling method of the mold, but the mold may be appropriately cooled by, for example, a method of causing a cooling medium to flow in a temperature control circuit within the mold.

(Time and Pressure)

In the molding step, the time for reaching the target pressure is preferably 1 sec to 10 sec. The target pressure is preferably 3 MPa to 100 MPa, and more preferably 5 MPa to 40 MPa.

EXAMPLES

Hereinafter, the present invention will be described in more detail with reference to examples, but the present invention is not limited thereto.

(1) Analysis of Reinforcing Fiber Bundle (A) in Random Mat

The method of obtaining the ratio of the reinforcing fiber bundles (A) with respect to the total amount of the reinforcing fibers in a mat is as follows.

A random mat was cut into a size of about 100 mm×100 mm, and the thickness (Ta) and the weight (Wa) were measured.

From the cut mat, all of fiber bundles were extracted by tweezers, and the fiber bundles were classified according to a thickness. In the present example, the classification was carried out with thickness units per about 0.2 mm.

In each classification, the length (Li) and the weight (Wi) of all fiber bundles, and the number (I) of fiber bundles were measured and recorded. Some fiber bundles which were too small to be extracted by the tweezers were lastly weighed in a mass (Wk). For the measurement of the weight, a balance capable of measuring to 1/1000 g was used. Especially, when the reinforcing fibers are carbon fibers, or when the average fiber length is short, the measurement is difficult due to a small weight of the fiber bundles thereof. In such a case, a plurality of classified fiber bundles was weighed in a mass.

After the measurement, the following calculation was performed. The number of fibers (Ni) in each fiber bundle was obtained from the fineness (F) of the reinforcing fibers in use by the following equation.

$$\text{number of fibers } (Ni) = Wi/(Li \times F)$$

The average number of the fibers (N) in the reinforcing fiber bundles (A) was obtained by the following equation.

$$N = \Sigma Ni/I$$

The volume of each fiber bundle (Vi), and the ratio (VR) of the reinforcing fiber bundles (A) with respect to the total reinforcing fibers were obtained by the following equations by using the specific weight (p) of the used reinforcing fibers.

$$Vi = Wi/\rho$$

$$VR = \Sigma Vi/Va \times 100$$

Here, Va represents the volume of a cut mat, and Va=100×100×Ta (2) Content of Reinforcing Fiber Bundles (A) in Shaped Product The content of reinforcing fiber bundles (A) in a shaped product was measured in the same manner as in the random mat after a resin was removed within a furnace at 500° C. for about 1 hour.

(3) Orientation of Fibers in Shaped Product (Isotropy of Fibers)

After the molding of a shaped product, a tensile test was performed in an arbitrary direction of the shaped product and the perpendicular direction thereto to measure a tensile modulus. Among the measured values of the tensile modulus, a ratio (Eδ) obtained by dividing the larger one by the smaller one was measured to determine the orientation degree of fibers. When the ratio of the tensile modulus is close to 1, the material is excellent in isotropy.

(4) Average Fiber Length (La) of Reinforcing Fibers Included in Shaped Product and Random Mat The average fiber length (La) of the reinforcing fibers included in the random mat was obtained by measuring and recording the lengths of randomly extracted 100 reinforcing fibers up to a unit of 1 mm by using a loupe. From all of the measured lengths (Li) of the reinforcing fibers, the average fiber length (La) was obtained by the following equation.

The average fiber length (La) of the reinforcing fibers included in the shaped product was obtained by measuring and recording the lengths of randomly extracted 100 reinforcing fibers up to a unit of 1 mm by using a loupe after removing a resin within a furnace at 500° C. for about 1 hour. From all of the measured lengths (Li) of the reinforcing fibers, the average fiber length (La) was obtained by the following equation.

average fiber length $(La)=\Sigma Li/100$ (5) Appearance of Shaped Product

The appearance of a shaped product was evaluated by visual observation, an optical microscope and hand touch, and the evaluation was performed on (dry) portions where the reinforcing fibers are insufficiently impregnated with a resin, wrinkles and cracks based on the following evaluation criteria.

○ (good): no particular defect is found in appearance
Δ (defective): slightly dry portion or wrinkle is found
× (seriously defective): many dry portions or wrinkles are found, or cracks are confirmed (6) Warpage of Shaped Product The warpage of a shaped product was evaluated by visual observation and hand touch based on the following evaluation criteria.

○ (good): no warpage is found
Δ (defective): slight warpage is observed
× (seriously defective): significant warpage (7) Moldability The formability was evaluated by observing the shape of a shaped product based on the following evaluation criteria.

○ (good): a fiber-reinforced composite material is filled up to ends, and no defect is found
Δ (defective): deficit or defect is partially found
× (seriously defective): many deficits or defects (8) Thickness Variation of Shaped Product Thicknesses of 10 positions in the whole of the obtained shaped product were measured by using a micrometer to obtain the (arithmetic) mean value and the standard deviation of the thicknesses. The minimum value and the maximum value among the measured values of thicknesses of the 10 positions, and the average value of thicknesses were used to calculate "variation of minimum thickness value" and "variation of maximum thickness value" defined by following equations (6) and (7), respectively, and then it was determined that the thickness variation of the shaped product satisfies the range of the average value ±10%.

variation of minimum thickness value (%)=100×
[(minimum thickness value−average\thickness value)/average thickness value] (6)

variation of maximum thickness value (%)=100×
[(maximum thickness value−average thickness value)/average thickness value] (7)

(9) Void Fraction of Prepreg

The void fraction of a prepreg was calculated by observing the cross section of a specimen with an optical microscope, and dividing a void presence area by a cross sectional area of the specimen used for observation. The observation of n=5 per specimen was performed, and the average value was set as the void fraction of the specimen.

Example 1

[Manufacturing of Random Mat]

As reinforcing fibers, carbon fibers "Tenax" (registered trademark) STS40-24KS (average fiber diameter 7 μm, fiber width 10 mm, tensile strength 4,000 MPa) manufactured by TOHO TENAX Co., Ltd were used. The carbon fibers were cut into a length of 20 mm while being extending, and then introduced into a tapered tube at the carbon fiber supply amount of 300 g/min. Within the tapered tube, air was sprayed to the carbon fibers at a wind velocity of 450 m/sec such that the fiber bundles were partially fiber-opened and the partially fiber-opened fiber bundles were sprayed on a table capable of moving in XY directions, the table provided below the outlet of the tapered tube while being suctioned by a blower from the bottom of the table.

A polyamide 6 resin (A1030, manufactured by Unitika Limited) as a matrix resin was supplied into the tapered tube at 360 g/min, and was sprayed simultaneously with the carbon fibers to obtain a random mat with a thickness of 7.5 mm in which the carbon fibers with the average fiber length of 20 mm were mixed with PA6.

The fiber areal weight of the reinforcing fibers in the obtained random mat was 370 g/m². In the obtained random mat, when the ratio of the reinforcing fiber bundles (A), and the average number of fibers (N) were investigated, the critical single fiber number defined by equation (1) was 86, the ratio of the reinforcing fiber bundles (A) with respect to the total amount of the fibers in the random mat was 35 Vol %, and the average number of the fibers (N) in the reinforcing fiber bundles (A) was 240. The manufacturing conditions and measurement/evaluation results of the random mat are represented in Table 1.

TABLE 1

| | Fiber | | | | | Resin | | Manufacturing condition | Random mat | Reinforcing fiber bundle (A) | | |
|---|---|---|---|---|---|---|---|---|---|---|---|---|
| | | Single fiber diameter (μm) | Fiber Length (mm) | Fiber areal weight (g/m²) | Supply amount (g/min) | | | Supply amount (g/min) | Wind velocity (m/sec) | Thickness (mm) | Critical single fiber number | Ratio (vol %) | Average number of fibers (N) (filaments) |
| | Kind | | | | | Kind | Form | | | | | | |
| Example 1 | CF | 7 | 20 | 370 | 300 | PA6 | Powder | 360 | 450 | 7.5 | 86 | 35 | 240 |
| Example 2 | CF | 7 | 20 | 185 | 150 | PA6 | Powder | 180 | 200 | 4.0 | 86 | 35 | 240 |
| Example 3 | CF | 5 | 20 | 125 | 100 | PC | Powder | 300 | 250 | 5.0 | 120 | 80 | 1000 |
| Example 4 | CF | 7 | 20 | 740 | 600 | PA6 | Powder | 720 | 1000 | 15.0 | 86 | 35 | 240 |

TABLE 1-continued

| | Fiber | | | | Resin | | | Manufacturing condition | Random mat | Reinforcing fiber bundle (A) | |
|---|---|---|---|---|---|---|---|---|---|---|---|
| | Kind | Single fiber diameter (μm) | Length (mm) | Fiber areal weight (g/m²) | Supply amount (g/min) | Kind | Form | Supply amount (g/min) | Wind velocity (m/sec) | Thickness (mm) | Critical single fiber number | Ratio (vol %) | Average number of fibers (N) (filaments) |
| Example 5 | CF | 7 | 20 | 370 | 300 | PA6 | Powder | 360 | 400 | 7.0 | 86 | 50 | 500 |
| Example 6 | CF | 7 | 20 | 125 | 100 | PA6 | Powder | 300 | 250 | 4.0 | 86 | 80 | 1000 |
| Example 7 | CF | 7 | 20 | 125 | 100 | PA6 | Molten | 300 | 250 | 4.0 | 86 | 80 | 1000 |
| Example 8 | CF | 7 | 10 | 370 | 300 | PA6 | Powder | 360 | 50 | 7.0 | 86 | 95 | 1200 |
| Example 9 | CF | 7 | 40 | 370 | 300 | PA6 | Powder | 360 | 250 | 7.0 | 86 | 80 | 1000 |
| Example 10 | GF | 15 | 50 | 370 | 300 | PA6 | Powder | 360 | 300 | 6.5 | 40 | 80 | 150 |
| Example 11 | CF | 7 | 20 | 370 | 300 | PA6 | Powder | 360 | 450 | 7.5 | 86 | 35 | 240 |
| Comp. Exp. 1 | CF | 7 | 20 | 370 | 300 | PA6 | Powder | 360 | 700 | 8.0 | 86 | 10 | 100 |
| Comp. Exp. 2 | CF | 7 | 20 | 370 | 300 | PA6 | Powder | 360 | 10 | 6.5 | 86 | 100 | 3000 |

[Prepreg Preparation Step]

The obtained random mat was heated up to 250° C., and pressurized at a pressure of 3 MPa for 7 minutes, and cooled to 80° C. to obtain a plate-shaped prepreg, with a thickness of 1.5 mm. The void fraction of the prepreg was 0.09%. The manufacturing conditions and measurement/evaluation results of the prepreg are represented in Table 2.

[Prepreg Arranging Step]

Two prepregs that were cut out to be 80% with respect to the mold cavity projection area were placed into an infrared oven and heated at 255° C., and then layered, and arranged within a flat plate mold of which temperature was controlled to 130° C. and a clearance of ends was 0.02 mm (FIG. 1).

[Molding Step]

Figure 3:
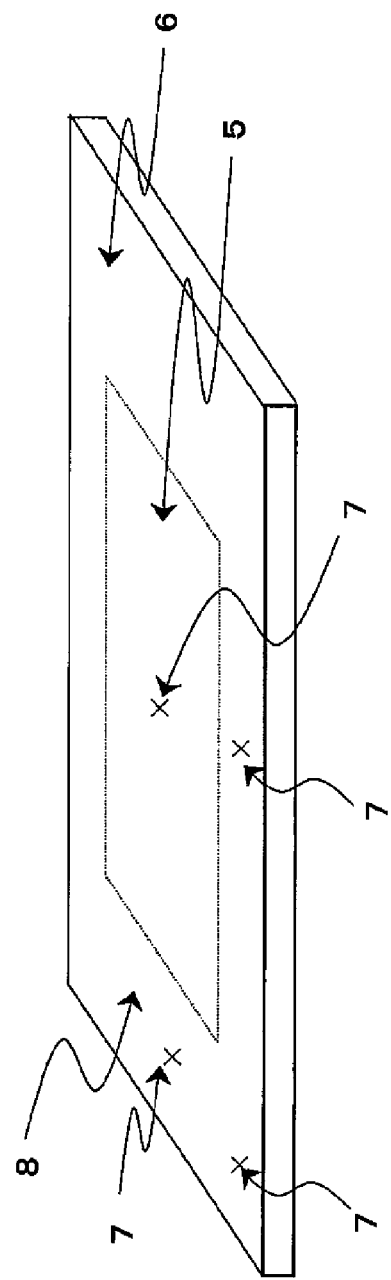
FIG. 3 is a schematic view (perspective view) illustrating a shaped product obtained in Examples 1 and 3.

Press-molding was performed at a pressure of 10 MPa for 30 sec to obtain a shaped product with a thickness of 2.4 mm. In the obtained shaped product, no material cracks or wrinkles occurred, a surface appearance was good, no product warpage was found, and the resin and the fibers were determined to be filled up to ends of the mold. The schematic view of the obtained shaped product is illustrated in FIG. 3.

TABLE 2

| | Prepreg manufacturing condition | | | Prepreg | | Shaped product manufacturing condition | | | | | |
|---|---|---|---|---|---|---|---|---|---|---|---|
| | Temperature (° C.) | Pressure (Mpa) | Time (min) | Thickness (mm) | Void fraction (%) | Layered number | Charge ratio (%) | Total area charge ratio (%) | Open temperature (° C.) | Die temperature (° C.) | Pressure (Mpa) | Time (sec) |
| Example 1 | 250 | 3 | 7 | 1.5 | 0.09 | 2 | 80 | 80 | 255 | 130 | 10 | 30 |
| Example 2 | 250 | 3 | 7 | 0.8 | 0.3 | 4 | 80 | 75 | 255 | 130 | 10 | 30 |
| Example 3 | 260 | 5 | 7 | 1.0 | 0.2 | 2 | 50 | 50 | 260 | 60 | 10 | 30 |
| Example 4 | 250 | 3 | 7 | 3.0 | 0.5 | 2 | 80 | 78 | 255 | 130 | 10 | 30 |
| Example 5 | 250 | 3 | 7 | 1.5 | 0.3 | 2 | 80 | 80 | 255 | 130 | 10 | 30 |
| Example 6 | 250 | 3 | 7 | 1.0 | 0.3 | 2 | 50 | 50 | 255 | 130 | 10 | 30 |
| Example 7 | 280 | 3 | 3 | 1.0 | 0.6 | 2 | 50 | 50 | 255 | 130 | 10 | 30 |
| Example 8 | 250 | 3 | 7 | 1.5 | 0.2 | 2 | 80 | 80 | 255 | 130 | 10 | 10 |
| Example 9 | 250 | 3 | 7 | 1.5 | 0.4 | 2 | 80 | 80 | 255 | 130 | 10 | 30 |
| Example 10 | 250 | 3 | 5 | 1.5 | 0.1 | 2 | 80 | 80 | 255 | 130 | 10 | 30 |
| Example 11 | 250 | 3 | 7 | 1.5 | 0.09 | 2 | 95 | 95 | 255 | 130 | 10 | 30 |
| Comp. Exp. 1 | 250 | 3 | 7 | 1.7 | 10.5 | 2 | 80 | 80 | 255 | 130 | 10 | 30 |
| Comp. Exp. 2 | 250 | 3 | 7 | 1.5 | 3.8 | 2 | 80 | 80 | 255 | 130 | 10 | 30 |

| | Shaped product | | | | | | |
|---|---|---|---|---|---|---|---|
| | Thickness (mm) | Formability | Appearance | Warpage | Vf (%) Charged portion | Vf (%) Flow portion | Ratio of tensile modulus |
| Example 1 | 2.4 | ○ | ○ | ○ | 35.0 | 35.2 | 1.03 |
| Example 2 | 2.4 | ○ | ○ | ○ | 35.0 | 35.3 | 1.08 |
| Example 3 | 1.0 | ○ | ○ | ○ | 20.1 | 19.9 | 1.21 |
| Example 4 | 4.8 | ○ | ○ | ○ | 34.8 | 34.6 | 1.09 |
| Example 5 | 2.4 | ○ | ○ | ○ | 35.2 | 34.9 | 1.02 |
| Example 6 | 1.0 | ○ | ○ | ○ | 18.2 | 18.0 | 1.10 |
| Example 7 | 1.0 | ○ | ○ | ○ | 18.1 | 18.0 | 1.13 |
| Example 8 | 2.4 | ○ | ○ | ○ | 35.3 | 35.0 | 1.11 |
| Example 9 | 2.4 | ○ | ○ | ○ | 35.1 | 34.8 | 1.05 |
| Example 10 | 2.4 | ○ | ○ | ○ | 27.3 | 27.0 | 1.25 |
| Example 11 | 1.5 | ○ | ○ | ○ | 35.1 | 34.5 | 1.10 |
| Comp. Exp. 1 | 3.0 | x | — | — | — | — | — |
| Comp. Exp. 2 | 2.4 | ○ | ○ | ○ | 35.5 | 33.7 | 1.38 |

The portion indicated by 5 is a charged portion of the base material (prepreg) within the mold, and the outer portion thereof indicated by 6 is a portion where the base material (prepreg) flowed to edges of the mold cavity. In the portions indicated by 7 in the drawing, when volume fractions (Vf) of the reinforcing fibers were investigated, respectively, the average of the flow portion was 35.2%, and the charged potion of the base material (prepreg) was 35.0%, that is, the flow portion and the base material (prepreg) charged potion had almost the same values. In the flow portion indicated by 8 in the drawing, when the tensile modulus was measured, the ratio (Eδ) obtained by dividing a larger one by a smaller one among the tensile modulus in two directions perpendicular to each other was 1.03, and isotropy was determined to be maintained. When the thickness variation of the obtained shaped product was evaluated, the thickness was confirmed to be almost uniform. The evaluation result of the thickness variation is represented in Table 3. The manufacturing conditions and measurement/evaluation results of the shaped product are shown in Table 2.

TABLE 3

| | | Example 1 |
|---|---|---|
| Thickness | | 2.4 |
| (Measurement value) | | 2.4 |
| | | 2.5 |
| | | 2.4 |
| | | 2.4 |
| | | 2.4 |
| | | 2.3 |
| | | 2.4 |
| | | 2.3 |
| | | 2.4 |
| Variation of thickness | Average value of thickness | 2.39 |
| | Variation of minimum thickness value (%) 1) | −3.77 |
| | Variation of minimum thickness value (%) 2) | 4.60 |
| | Variation in average value within ±10% | achieved |
| | Standard deviation of thickness | 0.057 |

Example 2

[Manufacturing of Random Mat]

A random mat with a thickness of 4.0 mm was obtained under the same conditions as in Example 1 except that the supply amount of carbon fibers was 150 g/min, the supply amount of polyamide 6 resin was 180 g/min, and the wind velocity within the tapered tube was 200 m/sec.

The fiber areal weight of the reinforcing fibers in the obtained random mat was 185 g/m². In the obtained random mat, when the ratio of the reinforcing fiber bundles (A), and the average number of the fibers (N) were investigated, the critical single fiber number defined by equation (1) was 86, the ratio of the reinforcing fiber bundles (A) with respect to the total amount of the fibers in the random mat was 35 Vol %, and the average number of the fibers (N) in the reinforcing fiber bundles (A) was 240. The manufacturing conditions and measurement/evaluation results of the random mat are represented in Table 1.

[Prepreg Preparation Step]

The obtained random mat was used to obtain a plate-shaped prepreg with a thickness of 0.8 mm in the same manner as in Example 1. The void fraction of the prepreg was 0.3%. The manufacturing conditions and measurement/evaluation results of the prepreg are represented in Table 2.

[Prepreg Arranging Step]

Figure 4:
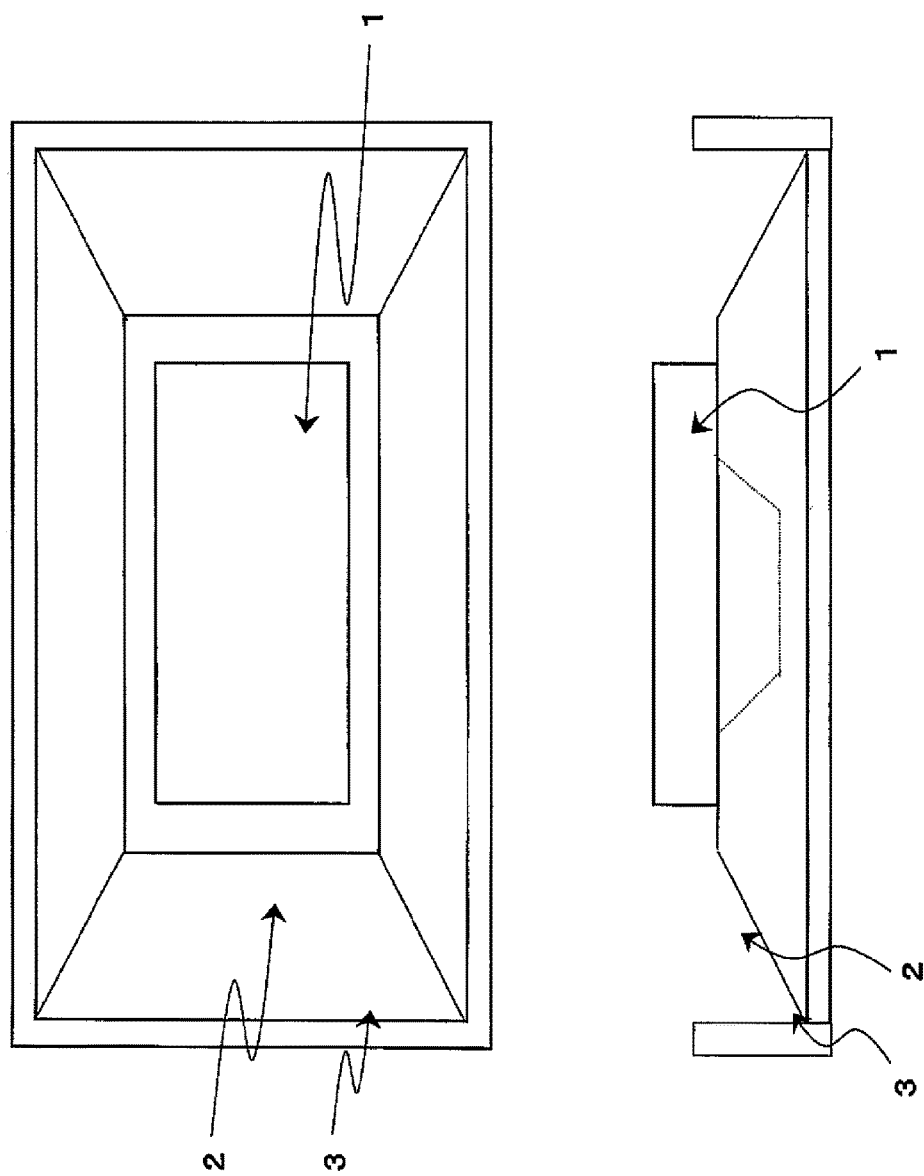
FIG. 4 is a schematic view illustrating arrangement of base materials within a mold in Example 2.

Four prepregs that were cut out to be 80% with respect to the mold cavity projection area were layered, placed into an infrared oven and heated at 255° C., and then arranged within a three-dimensional shaped mold (as illustrated in FIG. 2) of which a temperature was controlled to 130° C. and a clearance of ends was 0.05 mm (FIG. 4).

[Molding Step]

Figure 5:
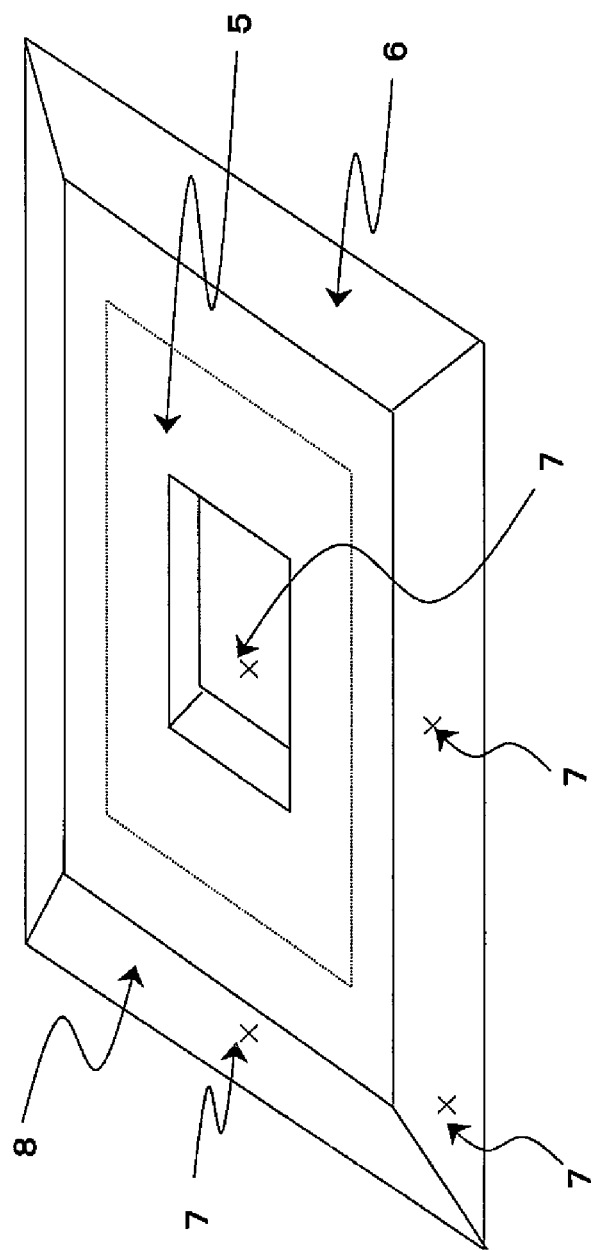
FIG. 5 is a schematic view (perspective view) illustrating a shaped product obtained in Example 2.

Press-molding was performed at a pressure of 10 MPa for 30 sec to obtain a shaped product with a thickness of 2.4 mm. In the obtained shaped product, no material cracks or wrinkles occurred, a surface appearance was good, no product warpage was found, and the resin and the fibers were determined to be filled up to ends of the mold. The schematic view of the obtained shaped product is illustrated in FIG. 5.

The portion indicated by 5 is a charged portion of the base material (prepreg) within the mold, and the outer portion thereof indicated by 6 is a portion where the base material (prepreg) flowed to edges of the mold cavity. In the portions indicated by 7 in the drawing, when volume fractions (Vf) of the reinforcing fibers were investigated, respectively, the average of the flow portion was 35.3%, and the charged potion of the base material (prepreg) was 35.0%, that is, the flow portion and the base material (prepreg) charged potion had almost the same values. In the flow portion indicated by 8 in the drawing, when the tensile modulus was measured, the ratio (Eδ) obtained by dividing a larger one by a smaller one among the tensile modulus in two directions perpendicular to each other was 1.08, and isotropy was determined to be maintained. The manufacturing conditions and measurement/evaluation results of the shaped product are represented in Table 2.

Example 3

[Manufacturing of Random Mat]

As reinforcing fibers, carbon fibers (manufactured by TOHO TENAX Co., Ltd.: TENAX IMS60-12K (average fiber diameter 5 μm, fiber width 6 mm)) were used. The carbon fibers were cut into a length of 20 mm while being extended, and then introduced into a tapered tube at the carbon fiber supply amount of 100 g/min. Within the tapered tube, air is sprayed to the carbon fibers at a wind velocity of 250 m/sec such that the fiber bundles were partially fiber-opened and the partially fiber-opened fiber bundles were sprayed on a table capable of moving in XY directions provided below the outlet of the tapered tube while being suctioned by a blower from the bottom of the table.

A polycarbonate resin (manufactured by Teijin Chemicals Ltd., Panlite (registered trademark) L-1225L) as a matrix resin was supplied into the tapered tube at 300 g/min, and was sprayed simultaneously with the carbon fibers to obtain a random mat with a thickness of about 5.0 mm in which the carbon fibers with the average fiber length of 20 mm were mixed with polycarbonate.

The fiber areal weight of the reinforcing fibers in the obtained random mat was 125 g/m². In the obtained random mat, when the ratio of the reinforcing fiber bundles (A), and the average number of the fibers (N) were investigated, the critical single fiber number defined by equation (1) was 120, the ratio of the reinforcing fiber bundles (A) with respect to the total amount of the fibers in the random mat was 80%, and the average number of the fibers (N) in the reinforcing fiber bundles (A) was 1000. The manufacturing conditions and measurement/evaluation results of the random mat are represented in Table 1.

[Prepreg Preparation Step]

The obtained random mat was heated up to 260° C., and pressurized at a pressure of 5 MPa for 7 minutes, and cooled to 50° C. to obtain a prepreg with a thickness of 1.0 mm. The void fraction of the prepreg was 0.2%. The manufacturing conditions and measurement/evaluation results of the prepreg are represented in Table 2.

[Prepreg Arranging Step]

Two base material sheets (prepregs) that were cut out to be 50% with respect to the mold cavity projection area were placed into an infrared oven and heated at 260° C., and then layered, and arranged within a flat plate mold of which a temperature was controlled to 60° C., and a clearance of ends was 0.02 mm (FIG. 1).

[Molding Step]

Press-molding was performed at a pressure of 10 MPa for 30 sec to obtain a shaped product with a thickness of 1.0 mm. In the obtained shaped product, no material cracks or wrinkles occurred, a surface appearance was good, no product warpage was found, and the resin and the fibers were determined to be filled up to ends of the mold. The schematic view of the obtained shaped product is illustrated in FIG. 3.

The portion indicated by 5 is a charged portion of the base material (prepreg) within the mold, and the outer portion thereof indicated by 6 is a portion where the base material (prepreg) flowed to edges of the mold cavity. In the portions indicated by 7 in the drawing, when volume fractions (Vf) of the reinforcing fibers were investigated, respectively, the average of the flow portion was 19.9%, and the charged potion of the base material (prepreg) was 20.1%, that is, both had almost the same values. When the tensile modulus was measured, the ratio (Eδ) obtained by dividing a larger one by a smaller one among the tensile modulus in two directions perpendicular to each other was 1.21, and isotropy was determined to be maintained. The manufacturing conditions and measurement/evaluation results of the shaped product are represented in Table 2.

Example 4

[Manufacturing of Random Mat]

A random mat with a thickness of 15.0 mm was obtained under the same conditions as in Example 1 except that the supply amount of carbon fibers was 600 g/min, the supply amount of polyamide 6 resin was 720 g/min, and the wind velocity within the tapered tube was 1000 m/sec.

The fiber areal weight of the reinforcing fibers in the obtained random mat was 740 g/m². In the obtained random mat, when the ratio of the reinforcing fiber bundles (A), and the average number of the fibers (N) were investigated, the critical single fiber number defined by equation (1) was 86, the ratio of the reinforcing fiber bundles (A) with respect to the total amount of the fibers in the random mat was 35 Vol %, and the average number of the fibers (N) in the reinforcing fiber bundles (A) was 240. The manufacturing conditions and measurement/evaluation results of the random mat are represented in Table 1.

[Prepreg Preparation Step]

The obtained random mat was used to obtain a plate-shaped prepreg with a thickness of 3.0 mm in the same manner as in Example 1. The void fraction of the prepreg was 0.5%. The manufacturing conditions and measurement/evaluation results of the prepreg are represented in Table 2.

[Prepreg Arranging Step]

Figure 6:
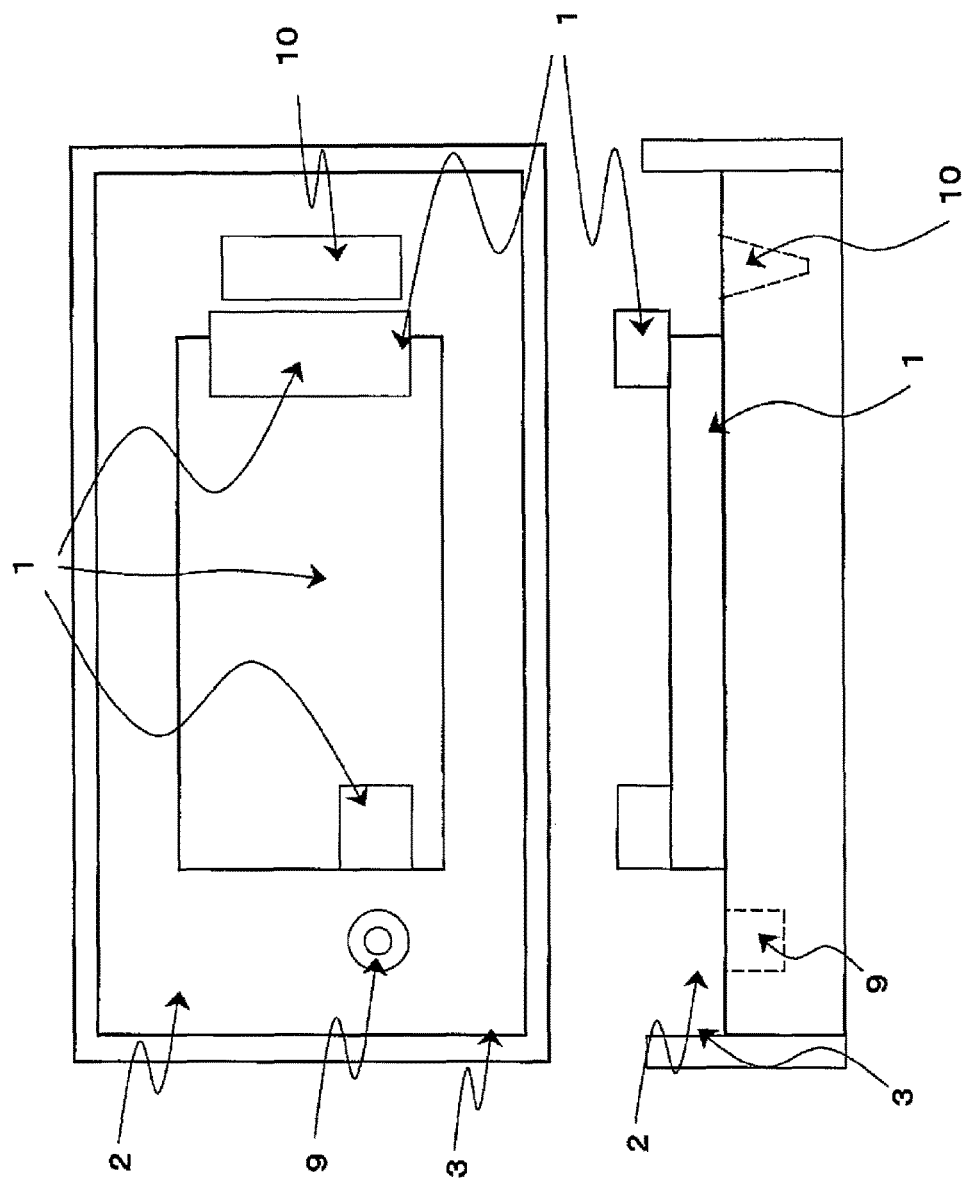
FIG. 6 is a schematic view illustrating arrangement of base materials within a mold in Example 4.

Two prepregs that were cut out to be 80% with respect to the mold cavity projection area were placed into an infrared oven and heated at 255° C., and then layered, and arranged within a rib/boss shaped mold of which a temperature was controlled to 130° C. and a clearance of ends was 0.08 mm (FIG. 6).

[Molding Step]

Figure 7:
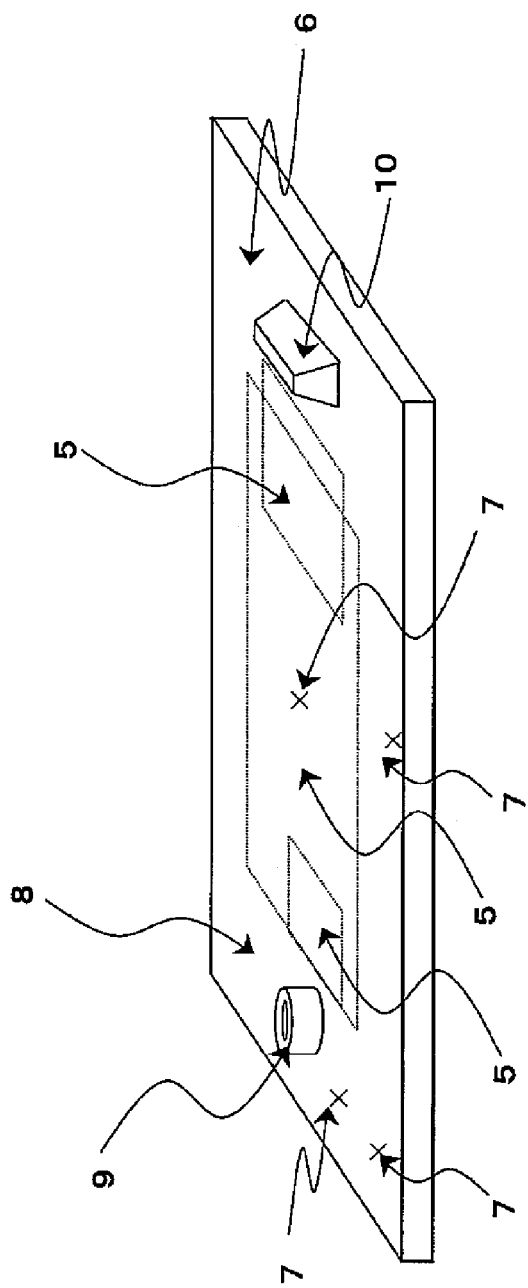
FIG. 7 a schematic view (perspective view) illustrating a shaped article obtained in Example 4.

Press-molding was performed at a pressure of 10 MPa for 30 sec to obtain a shaped product with a thickness of 4.8 mm. In the obtained shaped product, no material cracks or wrinkles occurred, a surface appearance was good, no product warpage was found, and the resin and the fibers were determined to be filled up to ends of the mold. The schematic view of the obtained shaped product is illustrated in FIG. 7.

The portion indicated by 5 is a charged portion of the base material (prepreg) within the mold, and the outer portion thereof indicated by 6 is a portion where the base material (prepreg) flowed to edges of the mold cavity. In the portions indicated by 7 in the drawing, when volume fractions (Vf) of the reinforcing fibers were investigated, respectively, the average of the flow portion was 34.6% and the charged potion of the base material (prepreg) was 34.8%, that is, both had almost the same values. When the tensile modulus of the flow portion was measured, the ratio (Eδ) obtained by dividing a larger one by a smaller one among tensile modulus in two directions perpendicular to each other was 1.09, and isotropy was determined to be maintained. The manufacturing conditions and measurement/evaluation results of the shaped product are represented in Table 2.

Example 5

[Manufacturing of Random Mat]

A random mat with a thickness of 7.0 mm was obtained under the same conditions as in Example 1 except that the supply amount of carbon fibers was 300 g/min, the supply amount of polyamide 6 resin was 360 g/min, and the wind velocity within the tapered tube was 400 m/sec.

The fiber areal weight of the reinforcing fibers in the obtained random mat was 370 g/m². In the obtained random mat, when the ratio of the reinforcing fiber bundles (A), and the average number of the fibers (N) were investigated, the critical single fiber number defined by equation (1) was 86, the ratio of the reinforcing fiber bundles (A) with respect to the total amount of the fibers in the random mat was 50 Vol %, and the average number of the fibers (N) in the reinforcing fiber bundles (A) was 500. The manufacturing conditions and measurement/evaluation results of the random mat are represented in Table 1.

[Prepreg Preparation Step]

The obtained random mat was used to obtain a plate-shaped prepreg with a thickness of 1.5 mm in the same manner as in Example 1. The void fraction of the prepreg was 0.3%. The manufacturing conditions and measurement/evaluation results of the prepreg are represented in Table 2.

[Prepreg Arranging Step and Molding Step]

Arrangement of the prepreg and molding of a shaped product were performed in the same manner as in Example 1 to obtain the shaped product with a thickness of 2.4 mm. In the obtained shaped product, no material cracks or wrinkles occurred, a surface appearance was good, no product warpage was found, and the resin and the fibers were determined to be filled up to ends of the mold.

When the volume fraction (Vf) of the reinforcing fibers was investigated, the average of the flow portion was 34.9%, and the charged potion of the base material (prepreg) was 35.2%, that is, both had almost the same values. When the tensile modulus of the flow portion was measured, the ratio (Eδ) obtained by dividing a larger one by a smaller one among the tensile modulus in two directions perpendicular to each other was 1.02, and isotropy was determined to be maintained. The manufacturing conditions and measurement/evaluation results of the shaped product are represented in Table 2.

Example 6

[Manufacturing of Random Mat]

A random mat with a thickness of 4.0 mm was obtained under the same conditions as in Example 1 except that the supply amount of carbon fibers was 100 g/min, the supply amount of polyamide 6 resin was 300 g/min, and the wind velocity within the tapered tube was 250 m/sec.

The fiber areal weight of the reinforcing fibers in the obtained random mat was 125 g/m². In the obtained random mat, when the ratio of the reinforcing fiber bundles (A), and the average number of the fibers (N) were investigated, the critical single fiber number defined by equation (1) was 86, the ratio of the reinforcing fiber bundles (A) with respect to the total amount of the fibers in the random mat was 80 Vol %, and the average number of the fibers (N) in the reinforcing fiber bundles (A) was 1000. The manufacturing conditions and measurement/evaluation results of the random mat are represented in Table 1.

[Prepreg Preparation Step]

The obtained random mat was used to obtain a plate-shaped prepreg with a thickness of 1.0 mm in the same manner as in Example 1. The void fraction of the prepreg was 0.3%. The manufacturing conditions and measurement/evaluation results of the prepreg are represented in Table 2.

[Prepreg Arranging Step]

Two prepregs that were cut out to be 50% with respect to the mold cavity projection area were placed into an infrared oven and heated at 255° C., and then layered, and arranged within a flat plate mold of which a temperature was controlled to 130° C. and a clearance of ends was 0.02 mm (FIG. 1).

[Molding Step]

Press-molding was performed at a pressure of 10 MPa for 30 sec to obtain a shaped product with a thickness of 1.0 mm. In the obtained shaped product, no material cracks or wrinkles occurred, a surface appearance was good, no product warpage was found, and the resin and the fibers were determined to be filled up to ends of the mold.

When volume fraction (Vf) of the reinforcing fibers was investigated, the average of the flow portion was 18.0%, and the charged potion of the base material (prepreg) was 18.2%, that is, both had almost the same values. When the tensile modulus of the flow portion was measured, the ratio (Eδ) obtained by dividing a larger one by a smaller one among the tensile modulus in two directions perpendicular to each other was 1.10, and isotropy was determined to be maintained. The manufacturing conditions and measurement/evaluation results of the shaped product are represented in Table 2.

Example 7

[Manufacturing of Random Mat]

As reinforcing fibers, carbon fibers "Tenax" (registered trademark) STS40-24KS (average fiber diameter 7 μm, fiber width 10 mm) manufactured by TOHO TENAX Co., Ltd were used. The fibers were slit into a width of 2 mm or less by using a vertical slitter, and cut into a fiber length of 20 mm. As a cutter, a rotary cutter that is capable of continuously cutting the reinforcing fiber bundles was used. The strand that had passed through the rotary cutter was introduced a tapered tube, and processed at a wind velocity of 250 m/sec to partially fiber-open the fiber bundles. Then, they were sprayed on a table capable of moving in XY directions provided below the outlet of the tapered tube while being suctioned by a blower from the bottom of the table, and thus a mat with a thickness of about 4 mm was formed.

Then, a molten matrix resin was supplied to the obtained mat. As the matrix resin, a polyamide 6 resin (A1030) manufactured by Unitika Limited was used. This was molten by an extruder and the molten resin was supplied to the entire surface of the mat from a T-die. Here, the portion on the mat surface to which the resin is supplied was heated by an infrared heater so as to suppress the resin from being cooled and solidified. The device was driven at the polyamide 6 resin supply amount of 300 g/min with respect to the reinforcing fiber supply amount of 100 g/min, to form a random mat constituted by the reinforcing fibers and the thermoplastic resin.

The fiber areal weight of the reinforcing fibers in the obtained random mat was 125 g/m². In the obtained random mat, when the ratio of the reinforcing fiber bundles (A), and the average number of the fibers (N) were investigated, the critical single fiber number defined by equation (1) was 86, the ratio of the reinforcing fiber bundles (A) with respect to the total amount of the fibers in the random mat was 80%, and the average number of the fibers (N) in the reinforcing fiber bundles (A) was 1000. The manufacturing conditions and measurement/evaluation results of the random mat are represented in Table 1.

[Prepreg Preparation Step]

The obtained random mat was heated and pressurized by a couple of heating rollers set to 280° C. to prepare a prepreg impregnated with the resin. The cooled prepreg had a thickness of 1.0 mm, and a void fraction of 0.6%. The manufacturing conditions and measurement/evaluation results of the prepreg are represented in Table 2.

[Prepreg Arranging Step]

Two base material sheets that were cut out to be 50% with respect to the mold cavity projection area were placed into an infrared oven and heated at 255° C., and then layered, and arranged within a flat plate mold of which a temperature was controlled to 130° C. and a clearance of ends was 0.02 mm (FIG. 1).

[Molding Step]

Press-molding was performed at a pressure of 10 MPa for 30 sec to obtain a shaped product with a thickness of 1.0 mm. In the obtained shaped product, no material cracks or wrinkles occurred, a surface appearance was good, no product warpage was found, and the resin and the fibers were determined to be filled up to ends of the mold.

When volume fraction (Vf) of the reinforcing fibers was investigated, the average of the flow portion was 18.0%, and the charged potion of the base material (prepreg) was 18.1%, that is, both had almost the same values. When the tensile modulus was measured, the ratio (Eδ) obtained by dividing a larger one by a smaller one among the tensile modulus in two directions perpendicular to each other was 1.13 and isotropy was determined to be maintained. The manufacturing conditions and measurement/evaluation results of the shaped product are represented in Table 2.

Example 8

[Manufacturing of Random Mat]

A random mat with a thickness of 7.0 mm was obtained under the same conditions as in Example 1 except that the average fiber length of the reinforcing fibers was 10 mm, and the wind velocity within the tapered tube was 50 m/sec.

The fiber areal weight of the reinforcing fibers in the obtained random mat was 370 g/m$^2$. In the obtained random mat, when the ratio of the reinforcing fiber bundles (A), and the average number of the fibers (N) were investigated, the critical single fiber number defined by equation (1) was 86, the ratio of the reinforcing fiber bundles (A) with respect to the total amount of the fibers in the random mat was 95 Vol %, and the average number of the fibers (N) in the reinforcing fiber bundles (A) was 1200. The manufacturing conditions and measurement/evaluation results of the random mat are represented in Table 1.

[Prepreg Preparation Step]

The obtained random mat was used to obtain a plate-shaped prepreg with a thickness of 1.5 mm in the same manner as in Example 1. The void fraction of the prepreg was 0.2%. The manufacturing conditions and measurement/evaluation results of the prepreg are represented in Table 2.

[Prepreg Arranging Step and Molding Step]

Arrangement of the prepreg and molding a shaped product were performed in the same manner as in Example 1 to obtain the shaped product with a thickness of 2.4 mm. In the obtained shaped product, no material cracks or wrinkles occurred, a surface appearance was good, no product warpage was found, and the resin and the fibers were determined to be filled up to ends of the mold.

When volume fraction (Vf) of the reinforcing fibers was investigated, the average of the flow portion was 35.0%, and the charged potion of the base material (prepreg) was 35.3%, that is, both had almost the same values. When the tensile modulus of the flow portion was measured, the ratio (Eδ) obtained by dividing a larger one by a smaller one among the tensile modulus in two directions perpendicular to each other was 1.11, and isotropy was determined to be maintained. The manufacturing conditions and measurement/evaluation results of the shaped product are represented in Table 2.

Example 9

[Manufacturing of Random Mat]

A random mat with a thickness of 7.0 mm was obtained under the same conditions as in Example 1 except that the average fiber length of the reinforcing fibers was 40 mm, and the wind velocity within the tapered tube was 250 m/sec.

The fiber areal weight of the reinforcing fibers in the obtained random mat was 370 g/m$^2$. In the obtained random mat, when the ratio of the reinforcing fiber bundles (A), and the average number of the fibers (N) were investigated, the critical single fiber number defined by equation (1) was 86, the ratio of the reinforcing fiber bundles (A) with respect to the total amount of the fibers in the random mat was 80 Vol %, and the average number of the fibers (N) in the reinforcing fiber bundles (A) was 1000. The manufacturing conditions and measurement/evaluation results of the random mat are represented in Table 1.

[Prepreg Preparation Step]

The obtained random mat was used to obtain a plate-shaped prepreg with a thickness of 1.5 mm in the same manner as in Example 1. The void fraction of the prepreg was 0.4%. The manufacturing conditions and measurement/evaluation results of the prepreg are represented in Table 2.

[Prepreg Arranging Step and Molding Step]

Arrangement of the prepreg and molding a shaped product were performed in the same manner as in Example 1 to obtain the shaped product with a thickness of 2.4 mm. In the obtained shaped product, no material cracks or wrinkles occurred, a surface appearance was good, no product warpage was found, and the resin and the fibers were determined to be filled up to ends of the mold.

When volume fraction (Vf) of the reinforcing fibers was investigated, the average of the flow portion was 34.8%, and the charged potion of the base material (prepreg) was 35.1%, that is, both had almost the same values. When the tensile modulus of the flow portion was measured, the ratio (Eδ) obtained by dividing a larger one by a smaller one among the tensile modulus in two directions perpendicular to each other was 1.05, and isotropy was determined to be maintained. The manufacturing conditions and measurement/evaluation results of the shaped product are represented in Table 2.

Example 10

[Manufacturing of Random Mat]

As reinforcing fibers, glass fibers manufactured by Nippon Electric Glass Co., Ltd., EX-2500 (average fiber diameter 15 μm, fiber width 9 mm), were used. The glass fibers were cut into a length of 50 mm while extended, and then introduced into a tapered tube at the glass fiber supply amount of 300 g/min. Within the tapered tube, air is sprayed to the glass fibers at a wind velocity of 300 m/sec such that the fiber bundles were partially fiber-opened and the partially fiber-opened fiber bundles were sprayed on a table capable of moving in XY directions provided below the outlet of the tapered tube while being suctioned by a blower from the bottom of the table.

Then, a polyamide 6 resin (A1030, manufactured by Unitika Limited) as a matrix resin was supplied into the tapered tube at 360 g/min, and was sprayed simultaneously with the glass fibers to obtain a random mat with a thickness of about 6.5 mm in which the glass fibers with the average fiber length of 50 mm was mixed with PA6.

The fiber areal weight of the reinforcing fibers in the obtained random mat was 370 g/m$^2$. In the obtained random mat, when the ratio of the reinforcing fiber bundles (A), and the average number of the fibers (N) were investigated, the critical single fiber number defined by equation (1) was 40, the ratio of the reinforcing fiber bundles (A) with respect to the total amount of the fibers in the random mat was 80%, and the average number of the fibers (N) in the reinforcing fiber bundles (A) was 150. The manufacturing conditions and measurement/evaluation results of the random mat are represented in Table 1.

[Prepreg Preparation Step]

The obtained random mat was heated up to 250° C., and pressurized at a pressure of 3 MPa for 5 minutes, and cooled to 80° C. to obtain a plate-shaped prepreg with a thickness of 1.5 mm. The void fraction of the prepreg was 0.1%. The manufacturing conditions and measurement/evaluation results of the prepreg are represented in Table 2.

[Prepreg Arranging Step and Molding Step]

Arrangement of the prepreg and molding a shaped product were performed in the same manner as in Example 1 to obtain the shaped product with a thickness of 2.4 mm. In the obtained shaped product, no material cracks or wrinkles occurred, a surface appearance was good, no product warpage was found, and the resin and the fibers were determined to be filled up to ends of the mold.

When volume fraction (Vf) of the reinforcing fibers was investigated, the average of the flow portion was 27.0%, and the charged potion of the base material (prepreg) was 27.3%, that is, both had almost the same values. When the tensile modulus of the flow portion was measured, the ratio (Eδ) obtained by dividing a larger one by a smaller one among the tensile modulus in two directions perpendicular to each other was 1.25, and isotropy was determined to be maintained. The manufacturing conditions and measurement/evaluation results of the shaped product are represented in Table 2.

Example 11

[Prepreg Arranging Step]

Two prepregs obtained from Example 1 which were cut out to be 50% with respect to the mold cavity projection area were placed into an infrared oven and heated at 255° C., and arranged within a flat plate mold of which a temperature was controlled to 130° C., and a clearance of ends was 0.02 mm such that one side of each end portion was overlapped by about 30 mm as illustrated in FIG. 9. The charge ratio of the base materials (prepregs) after the overlapping arrangement was 95% with respect to the mold cavity projection area.

[Molding Step]

Press-molding was performed at a pressure of 10 MPa for 30 sec to obtain a shaped product with a thickness of 1.5 mm. In the obtained shaped product, no material cracks or wrinkles occurred, a surface appearance was good, no product warpage was found, and the resin and the fibers were determined to be filled up to ends of the mold.

For volume fraction (Vf) of the reinforcing fibers, the average of the flow portion was 34.5%, and the charged potion of the base material (prepreg) was 35.1%, that is, both had almost the same values. When the tensile modulus of the flow portion was measured, the ratio (Eδ) of the tensile modulus in two directions perpendicular to each other was 1.10, and isotropy was determined to be maintained. When the tensile test was performed on the base material overlapping portion, the tensile strength of the overlapping portion was not significantly different from other portions. The manufacturing conditions and measurement/evaluation results of the shaped product are represented in Table 2.

Comparative Example 1

[Manufacturing of Random Mat]

A random mat with a thickness of 8.0 mm was obtained under the same conditions as in Example 1 except that the wind velocity within the tapered tube was 700 m/sec.

The fiber areal weight of the reinforcing fibers in the obtained random mat was 370 g/m². In the obtained random mat, when the ratio of the reinforcing fiber bundles (A), and the average number of the fibers (N) were investigated, the critical single fiber number defined by equation (1) was 86, the ratio of the reinforcing fiber bundles (A) with respect to the total amount of the fibers in the random mat was 10 Vol %, and the average number of the fibers (N) in the reinforcing fiber bundles (A) was 100. The manufacturing conditions and measurement/evaluation results of the random mat are represented in Table 1.

[Prepreg Preparation Step]

The obtained random mat was used to obtain a plate-shaped prepreg with a thickness of 1.7 mm in the same manner as in Example 1. The void fraction of the prepreg was 10.5%. The manufacturing conditions and measurement/evaluation results of the prepreg are represented in Table 2.

[Prepreg Arranging Step and Molding Step]

Arrangement of the prepreg and molding a shaped product were performed in the same manner as in Example 1 to obtain the shaped product with a thickness of 3.0 mm. In the obtained shaped product, materials were not spread up to the end thereof, and thus defect portions were observed. The manufacturing conditions and measurement/evaluation results of the shaped product are represented in Table 2.

Comparative Example 2

A random mat with a thickness of 6.5 mm was obtained under the same conditions as in Example 1 except that the wind velocity within the tapered tube was 10 m/sec.

The fiber areal weight of the reinforcing fibers in the obtained random mat was 370 g/m². In the obtained random mat, when the ratio of the reinforcing fiber bundles (A), and the average number of the fibers (N) were investigated, the critical single fiber number defined by equation (1) was 86, the ratio of the reinforcing fiber bundles (A) with respect to the total amount of the fibers in the random mat was 100 Vol %, and the average number of the fibers (N) in the reinforcing fiber bundles (A) was 3000. The manufacturing conditions and measurement/evaluation results of the random mat are represented in Table 1.

[Prepreg Preparation Step]

The obtained random mat was used to obtain a plate-shaped prepreg with a thickness of 1.5 mm in the same manner as in Example 1. The void fraction of the prepreg was 3.8%. The manufacturing conditions and measurement/evaluation results of the prepreg are represented in Table 2.

[Prepreg Arranging Step and Molding Step]

Arrangement of the prepreg and molding a shaped product were performed in the same manner as in Example 1 to obtain the shaped product with a thickness of 2.4 mm. The moldability, and the surface appearance of the obtained shaped product were good, and no product warpage was found.

However, for volume fraction (Vf) of the reinforcing fibers, the average of the flow portion was 33.7%, and the charged potion of the base material (prepreg) was 35.5%. When the tensile modulus of the flow portion was measured, the ratio (Eδ) of the tensile modulus in two directions perpendicular to each other was 1.38 and anisotropy was observed. The manufacturing conditions and measurement/evaluation results of the shaped product are represented in Table 2.

INDUSTRIAL APPLICABILITY

The shaped product including reinforcing fibers and a thermoplastic resin, the shaped product obtained by the manufacturing method of the present invention, is lightweight and has a shape flexibility, and thus may be a shaped product with maintained isotropy of the fibers to the end thereof even if press-molded under conditions in which the charge ratio of a prepreg to a mold is low. Further, it is excellent in moldability, thinness, specific rigidity, productivity, and economy, and thus may be effectively used in electrical/electronic components or housings such as electrical/electronic device parts, automotive parts, personal computers, OA devices, AV devices, mobile phones, phones, facsimiles, household appliances, toy products. Especially, it may be preferably used in automotive parts to be mounted in environmentally friendly automobiles.

DESCRIPTION OF REFERENCE NUMERALS

1: prepreg, 2: mold cavity, 3: mold cavity edge, 4: total mold cavity area, 5: base material (prepreg) charged potion, 6: flow portion, 7: measurement point of Vf, 8: measurement point of tensile modulus, 9: boss-shaped portion, 10: rib-shaped portion, 11: draft angle of mold ends, 12: clearance of mold, 13: overlapping portions of prepregs

What is claimed is:

1. A prepreg comprising:
reinforcing fibers having an average fiber length of 5 mm to 100 mm; and
a thermoplastic resin,
wherein the reinforcing fibers are substantially two-dimensionally randomly oriented at a fiber areal weight of 25 g/m² to 10000 g/m²,
reinforcing fiber bundles (A) constituted by the reinforcing fibers of a critical single fiber number or more, the critical single fiber number being defined by equation (1), are included in an amount of 20 Vol % or more and less than 99 Vol % with respect to the total amount of the reinforcing fibers in the prepreg,
an average number of the reinforcing fibers (N) in the reinforcing fiber bundles (A) satisfies equation (2):

$$\text{Critical single fiber number} = 600/D \tag{1}$$

$$0.7 \times 10^4 / D^2 < N < 1 \times 10^5 / D^2 \tag{2}$$

wherein, in equation (1) and equation (2), D represents an average fiber diameter (μm) of single reinforcing fibers,
wherein the reinforcing fiber bundles (A) are classified with thickness units per about 0.2 mm; and
a void fraction of the prepreg is 0% to 30%.

2. The prepreg according to claim 1,
wherein a content of the thermoplastic resin in the prepreg is 50 parts to 1000 parts by mass with respect to 100 parts by mass of the reinforcing fibers.

3. The prepreg according to claim 1,
wherein a thickness of the prepreg is 0.1 mm or more and 30 mm or less.

4. The prepreg according to claim 1,
wherein the reinforcing fibers are at least one of selected from the group consisting of a carbon fiber, an aramid fiber, and a glass fiber.

5. A shaped product comprising a fiber-reinforced composite material, which is obtained by a method for manufacturing, the method comprising:
arranging the prepreg according to claim 1 set at a temperature of the melting point or more and less than the thermal decomposition temperature in the case where the thermoplastic resin is crystalline or at a temperature of the glass transition temperature or more and less than the thermal decomposition temperature in the case where the thermoplastic resin is amorphous in a mold to be a charge ratio represented by equation (3) is 50% or more and 100% or less, the mold which is controlled to a temperature less than the melting point temperature in the case where the thermoplastic resin is crystalline or a temperature less than the glass transition temperature in the case where the thermoplastic resin is amorphous:

$$\text{charge ratio (\%)} = 100 \times [\text{base material area (mm}^2) / \text{mold cavity projection area (mm}^2)] \tag{3}$$

wherein, in equation (3), a base material area represents a projection area of all the arranged prepreg in a draft direction, and
a mold cavity projection area represents a projection area in the draft direction; and
obtaining the shaped product by completion of molding the prepreg at a temperature less than the melting point in the case where the thermoplastic resin is crystalline or at a temperature less than the glass transition temperature in the case where the thermoplastic resin is amorphous, while pressurizing the prepreg within the mold,
wherein a ratio (Eδ) obtained by dividing a larger tensile modulus by a smaller tensile modulus among tensile modulus in an arbitrary direction and a direction perpendicular thereto is 1.0 to 1.3.

6. The shaped product according to claim 5,
wherein a thickness variation of the shaped product satisfies a range of an average value in thickness ±10%.

* * * * *